United States Patent
Ishii

(10) Patent No.: US 11,022,839 B2
(45) Date of Patent: Jun. 1, 2021

(54) DISPLAY APPARATUS CONFIGURED TO DISPLAY INPUT IMAGE AND GRAPHIC IMAGE AND METHOD FOR CONTROLLING SAME

(71) Applicant: CANON KABUSHIKI KAISHA, Tokyo (JP)

(72) Inventor: Shinya Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 16/123,044

(22) Filed: Sep. 6, 2018

(65) Prior Publication Data
US 2019/0086725 A1 Mar. 21, 2019

(30) Foreign Application Priority Data

Sep. 15, 2017 (JP) .............................. JP2017-177655

(51) Int. Cl.
*G02F 1/13357* (2006.01)
*G09G 3/36* (2006.01)
(Continued)

(52) U.S. Cl.
CPC .... *G02F 1/133602* (2013.01); *G02F 1/13338* (2013.01); *G09G 3/2007* (2013.01); *G09G 3/2092* (2013.01); *G09G 3/3607* (2013.01); *G09G 3/3611* (2013.01); *G09G 2320/0626* (2013.01); *G09G 2340/06* (2013.01)

(58) Field of Classification Search
CPC .......... G02F 1/133602; G02F 1/13338; G09G 3/2007; G09G 3/2092; G09G 3/3607; G09G 2320/0626; G09G 2340/06
See application file for complete search history.

(56) References Cited

U.S. PATENT DOCUMENTS 8,390,563 B2  3/2013 Nonaka et al.
9,117,410 B2  8/2015 Watanabe et al.
(Continued)

FOREIGN PATENT DOCUMENTS

CN  103617792 A  3/2014
CN  105609035 A  5/2016
(Continued)

OTHER PUBLICATIONS

Jul. 23, 2020 Chinese Official Action in Chinese Patent Appln. No. 201811068437.3.

*Primary Examiner* — Yaron Cohen
(74) *Attorney, Agent, or Firm* — Venable LLP

(57) ABSTRACT

A display apparatus according to the present invention, includes: a light-emitting unit of which light emission brightness is controllable; a display panel configured to transmit light from the light-emitting unit and display an image; an operation unit configured to receive an operation for instructing a mode to be set, out of a plurality of modes including a first mode in which a first image including an input image and not including a graphic image is displayed and a second mode in which a second image including the input image and the graphic image is displayed; and a control unit configured to perform brightness control for controlling the light emission brightness of the light-emitting unit so that an upper-limit display brightness in the second mode is lower than an upper-limit display brightness in the first mode.

20 Claims, 11 Drawing Sheets

(51) Int. Cl.
*G02F 1/1333* (2006.01)
*G09G 3/20* (2006.01)

(56) References Cited

U.S. PATENT DOCUMENTS

| | | | |
|---|---|---|---|
| 9,536,479 | B2 | 1/2017 | Watanabe et al. |
| 2010/0110180 | A1* | 5/2010 | Tonogai .................. G06T 5/50 |
| | | | 348/136 |
| 2010/0238201 | A1 | 9/2010 | Nonaka et al. |
| 2015/0009246 | A1 | 1/2015 | Watanabe et al. |
| 2015/0022554 | A1 | 1/2015 | Nobori |
| 2015/0332636 | A1 | 11/2015 | Watanabe et al. |
| 2016/0217731 | A1 | 7/2016 | Joo et al. |
| 2017/0068447 | A1* | 3/2017 | Hong .................. G06F 3/04817 |
| 2017/0110063 | A1 | 4/2017 | Arai et al. |

FOREIGN PATENT DOCUMENTS

| | | | |
|---|---|---|---|
| CN | 106131453 | A | 11/2016 |
| JP | 2006-317577 | A | 11/2006 |
| JP | 2010-224014 | A | 10/2010 |

\* cited by examiner

… (1)

DISPLAY APPARATUS CONFIGURED TO DISPLAY INPUT IMAGE AND GRAPHIC IMAGE AND METHOD FOR CONTROLLING SAME

BACKGROUND OF THE INVENTION

Field of the Invention

The present invention relates to a display apparatus and a method for controlling the same.

Description of the Related Art

In recent years, the number of image pickup apparatuses capable of imaging image data (data of a captured image; image data representing an image of an object) having a wide dynamic range is increasing. The wide dynamic range is referred to as a "high dynamic range (HDR)" and the like, and image data having an HDR is referred to as "HDR image data" and the like. Cases in which the HDR image data is taken into account are increasing, for example, in image production locations, development sites of apparatuses (image processing apparatuses, display apparatuses, and the like).

A high-precision display apparatus is needed in order to display an image with fidelity to the HDR image data. For example, a display apparatus having a high upper-limit display brightness, capable of displaying a high-contrast image, and capable of displaying an image having a wide dynamic range is needed. A display apparatus capable of displaying an image with fidelity to the HDR image data is hereinafter referred to as an "HDR display apparatus". For example, a display apparatus satisfying a condition that the upper-limit display brightness is at least 1000 nits (=1000 cd/m$^2$) and the lower-limit display brightness is not more than 0.03 nits may be defined as an HDR display apparatus. A liquid-crystal display apparatus satisfying a condition that the upper-limit display brightness is at least 1000 nits and the lower-limit display brightness is not more than 0.05 nits may be defined as an HDR display apparatus. A self-luminous display apparatus (an organic EL display apparatus and the like) satisfying a condition that the upper-limit display brightness is at least 540 nits and the lower-limit display brightness is not more than 0.0005 nits may be defined as an HDR display apparatus.

However, the HDR display apparatus is not always usable in various locations. For example, a non-HDR display apparatus is often used in a photographing location due to the restriction of power source, the restriction of baggage, and the like. The non-HDR display apparatus is a standard dynamic range (SDR) display apparatus that is not an HDR display apparatus, an HDR display apparatus having a limited display capability, and the like. The non-HDR display apparatus is a display apparatus having a display brightness having a narrow dynamic range and a low upper-limit display brightness, for example. The non-HDR display apparatus cannot display an image with fidelity to the HDR image data. A liquid-crystal display apparatus or a self-luminous display apparatus having an upper-limit display brightness of not more than 100 nits may be defined as a non-HDR display apparatus, or a liquid-crystal display apparatus or a self-luminous display apparatus having an upper-limit display brightness of not more than 500 nits may be defined as a non-HDR display apparatus.

Therefore, an HDR assistance display in which the correspondence relationship between the data brightness of the HDR image data and the display brightness of the non-HDR display apparatus is the correspondence relationship illustrated in FIG. 4A may be performed in the non-HDR display apparatus so that a user can check the gradation of an image of the HDR image data. In the correspondence relationship in FIG. 4A, the display brightness of the non-HDR display apparatus linearly increases from the lower-limit display brightness to the upper-limit display brightness as the data brightness of the HDR image data increases from the lower-limit data brightness to the upper-limit data brightness.

In display apparatuses such as the HDR display apparatus or the non-HDR display apparatus, the power consumption or the temperature of the display apparatus increases depending on the increase of the display brightness. In particular, the power consumption or the temperature considerably increases in display in which the display brightness is high, that is, at least 1000 nits. In addition, the temperature of the display apparatus tends to increase more easily as a housing of the display apparatus becomes smaller. Therefore, there may be cases where display with high display brightness cannot be performed or the time in which display with high display brightness can be performed is limited. That is, there may be a case where the display apparatus cannot be used without limiting the display capability. Therefore, the reduction of the power consumption of the display apparatus is required.

A technology relating to the reduction of the power consumption is disclosed in Japanese Unexamined Patent Application Publication No. 2010-224014, for example. In the technology disclosed in Japanese Unexamined Patent Application Publication No. 2010-224014, the emission intensity of a backlight is controlled in accordance with an input image and the input image is corrected in accordance with the emission intensity of the backlight. As a result, the image is displayed with a high dynamic range and low power consumption.

SUMMARY OF THE INVENTION

HDR assistance display is often performed in order to check the gradation of an image of an input image in a data brightness range in which the data brightness of the input image is low and for a data brightness range in which the data brightness of the input image is high. However, the gradation of an image as above cannot be checked in the image displayed in the technology disclosed in Japanese Unexamined Patent Application Publication No. 2010-224014. Therefore, the technology disclosed in Japanese Unexamined Patent Application Publication No. 2010-224014 is not suitable for HDR assistance display.

The present invention in its first aspect provides a display apparatus, comprising:

a light-emitting unit of which light emission brightness is controllable;

a display panel configured to transmit light from the light-emitting unit and display an image;

an operation unit configured to receive an operation for instructing a mode to be set, out of a plurality of modes including a first mode in which a first image including an input image and not including a graphic image is displayed and a second mode in which a second image including the input image and the graphic image is displayed; and a control unit configured to perform brightness control for controlling the light emission brightness of the light-emitting unit so that an upper-limit display brightness in the second mode is lower than an upper-limit display brightness in the first mode.

The present invention in its second aspect provides a display apparatus, comprising:

a display unit configured to display an image;

an operation unit configured to receive an operation for instructing a mode to be set, out of a plurality of modes including a first mode in which a first image including an input image and not including a graphic image is displayed and a second mode in which a second image including the input image and the graphic image is displayed; and a control unit configured to perform brightness control for controlling light emission brightness of a light source of the display apparatus so that an upper-limit display brightness in the second mode is lower than an upper-limit display brightness in the first mode.

The present invention in its third aspect provides a method for controlling a display apparatus including a light-emitting unit of which light emission brightness is controllable, and a display panel configured to transmit light from the light-emitting unit and display an image, the method comprising:

receiving an operation for instructing a mode to be set, out of a plurality of modes including a first mode in which a first image including an input image and not including a graphic image is displayed and a second mode in which a second image including the input image and the graphic image is displayed; and performing brightness control for controlling the light emission brightness of the light-emitting unit so that an upper-limit display brightness in the second mode is lower than an upper-limit display brightness in the first mode.

The present invention in its fourth aspect provides a method for controlling a display apparatus including a display unit configured to display an image, the method comprising:

receiving an operation for instructing a mode to be set, out of a plurality of modes including a first mode in which a first image including an input image and not including a graphic image is displayed and a second mode in which a second image including the input image and the graphic image is displayed; and performing brightness control for controlling light emission brightness of a light source of the display apparatus so that an upper-limit display brightness in the second mode is lower than an upper-limit display brightness in the first mode.

Further features of the present invention will become apparent from the following description of exemplary embodiments with reference to the attached drawings.

DESCRIPTION OF THE EMBODIMENTS

Example 1

Example 1 of the present invention is described below.

An example in which a display apparatus according to this example is mounted on an image pickup apparatus (digital camera) is described below, but the display apparatus according to this example may be an apparatus separate from the image pickup apparatus. An example in which a display unit of the display apparatus is a liquid-crystal display unit including a backlight unit and a liquid-crystal panel is described below, but the display unit is not limited to the liquid-crystal display unit. For example, another display unit including a light-emitting unit and a display panel that displays an image by transmitting light emitted from the light-emitting unit on the basis of image data may be used. Specifically, a MEMS shutter system display unit using a micro electro mechanical system (MEMS) shutter as a display element may be used. A self-luminous display unit may be used. Specifically, an organic electro-luminescence (EL) display panel, a plasma display panel, and the like may be used.

Figure 1:
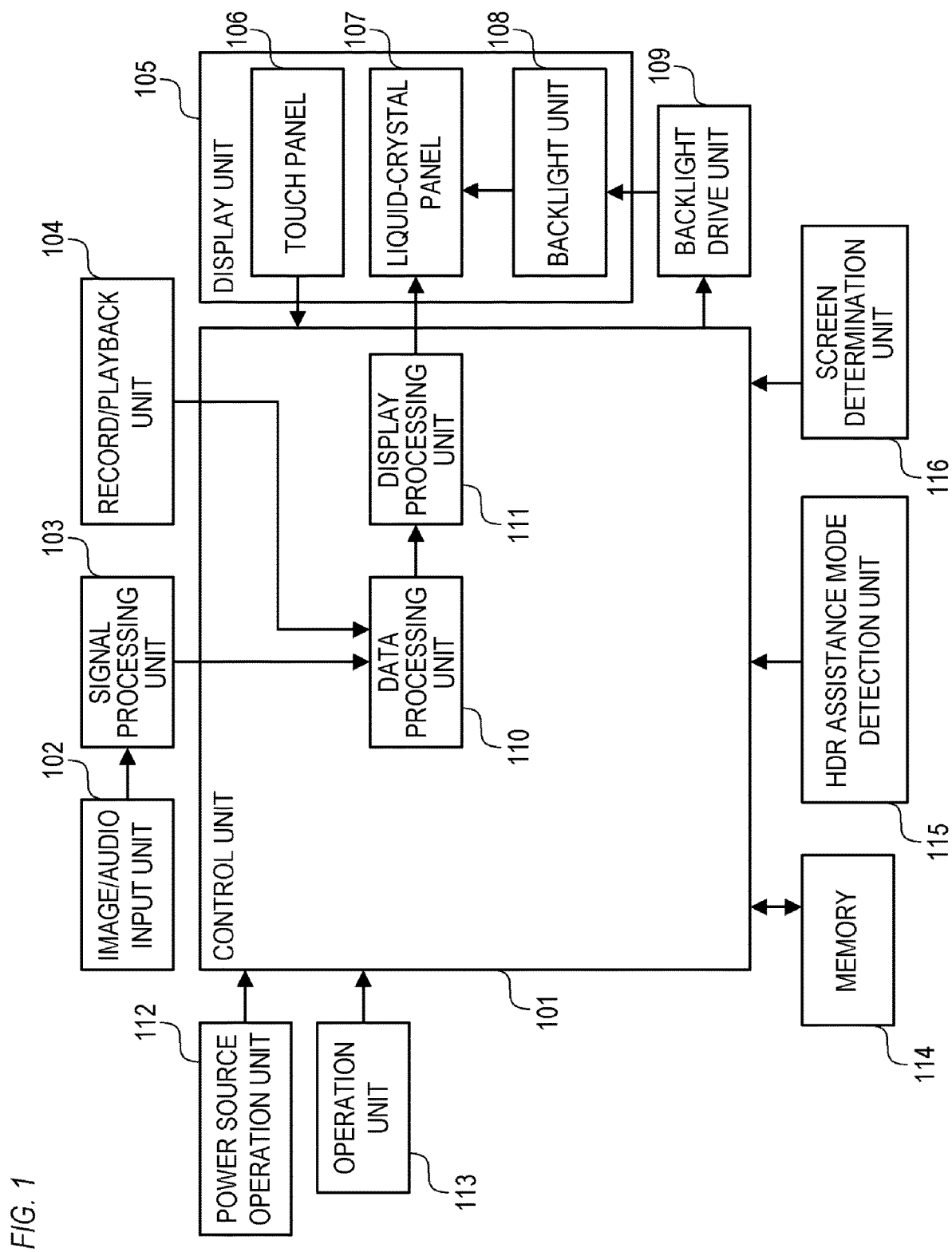
FIG. 1 is a diagram illustrating a configuration example of an image pickup apparatus according to Example 1.

The configuration of an image pickup apparatus (digital video camera) according to this example is described with reference to FIG. 1. FIG. 1 illustrates a configuration example of the image pickup apparatus according to this example.

A control unit 101 performs various processing of the image pickup apparatus. The control unit 101 is connected to a signal processing unit 103, a record/playback unit 104, a liquid-crystal display unit 105, a backlight drive unit 109, a power source operation unit 112, an operation unit 113, a memory 114, an HDR assistance mode detection unit 115, and a screen determination unit 116. The control unit 101 includes a data processing unit 110 and a display processing unit 111, and the liquid-crystal display unit 105 includes a touch panel 106, a liquid-crystal panel 107, and a backlight unit 108.

An image/audio input unit 102 acquires an image signal that is an analog signal representing an image, and an audio signal that is an analog signal representing audio, and outputs the image signal and the audio signal to the signal processing unit 103. In this example, the image/audio input unit 102 includes an image pickup unit (an image pickup sensor; an image pickup element) and an audio input unit (microphone). The light from an object enters the image pickup unit via a lens. As a result, an optical image representing the object is formed (image formation) in the image pickup unit. The image pickup unit converts the formed optical image into an image signal having a predetermined signal format, and outputs the image signal. The audio input unit converts input audio into an audio signal and outputs the audio signal.

The signal processing unit 103 performs predetermined signal processing on the analog signal output from the image/audio input unit 102. The predetermined signal processing includes processing for the image signal, processing for the audio signal, or both. The predetermined signal processing includes noise reduction processing for reducing noise components and automatic gain control (AGC) processing for maintaining a constant signal level, for example. The signal processing unit 103 includes an A/D conversion unit that converts the analog signal after the predetermined signal processing into a digital signal (digital data). The signal processing unit 103 outputs the digital data (image data that is digital data representing the image and audio data that is digital data representing the audio) acquired by the A/D conversion unit to the control unit 101.

The record/playback unit 104 performs record processing, playback processing, and the like. The record processing is processing for recording the digital data (the image data and the audio data) output from the control unit 101 to the record/playback unit 104 in a storage unit. The playback processing is processing for reading the digital data (the image data and the audio data) from the storage unit and outputting the read digital data to the control unit 101. In this example, the record/playback unit 104 switches between the record processing and the playback processing and executes the record processing and the playback processing in accordance with the instruction (command) from the control unit 101.

The touch panel 106 is an operation unit capable of receiving various operations for the image pickup apparatus. For example, the touch panel 106 can receive a mode setting operation for instructing a display mode to be set, a mode release operation for instructing the settings of the display mode to be released, a record operation for instructing the record processing to be executed, a playback operation for instructing the playback processing to be executed, and the like. Specifically, the touch panel 106 detects the contact of the user with the touch panel 106 and outputs the detection result of the contact (the contact position, the contact time, the change of the contact position, and the like) to the control unit 101. The control unit 101 determines the operation that has been performed from the detection result of the contact. In this example, the touch panel 106 is provided on a display surface of the liquid-crystal panel 107. The touch panel 106 may be provided in other positions. When the user performs the mode setting operation for the image pickup apparatus, the control unit 101 sets a display mode corresponding to the mode setting operation. The control unit 101 can set at least one display mode out of a plurality of display modes. When the user performs the mode release operation for the image pickup apparatus, the control unit 101 releases the settings of the display mode corresponding to the mode release operation.

An image based on the image data (input image data) is displayed on the liquid-crystal display unit 105 by the display control of the control unit 101. Specifically, when the image data is output to the liquid-crystal panel 107 from the control unit 101, the transmittance of the liquid-crystal panel 107 is controlled to be a transmittance corresponding to the image data output to the liquid-crystal panel 107. The backlight unit 108 applies light on a rear surface of the liquid-crystal panel 107. The image is displayed by transmitting the light from the backlight unit 108 to the liquid-crystal panel 107. The dynamic range of the non-HDR liquid-crystal panel 107 is narrower than the dynamic range of the input HDR image data. For example, the upper-limit display brightness (the upper-limit display brightness that is the brightness on the display surface) of the non-HDR liquid-crystal panel 107 is not more than 100 nits. The upper-limit display brightness of the non-HDR liquid-crystal panel 107 may be higher than 100 nits and not more than 500 nits. The upper-limit display brightness of the non-HDR liquid-crystal panel 107 may be not more than 1000 nits.

The backlight drive unit 109 supplies a driving signal to the backlight unit 108. For example, the backlight drive unit 109 is a power source circuit that supplies electric current to the backlight unit 108. The backlight unit 108 emits light with a light emission brightness (light emission amount) corresponding to the supplied driving signal. The control unit 101 can control the light emission brightness of the backlight unit 108. Specifically, the control unit 101 can control the driving signal output from the backlight drive unit 109. The light emission brightness of the backlight unit 108 is controlled by controlling the driving signal. The control unit 101 controls the driving signal (the light emission brightness of the backlight unit 108) on the basis of the input image data and the operation performed for the image pickup apparatus, for example. In this example, the control unit 101 can control the driving signal so that the upper-limit display brightness of the liquid-crystal display unit 105 is controlled within a range not more than 1000 nits.

The data processing unit 110 acquires the input image data and the input audio data. For example, the data processing unit 110 acquires the image data output from the record/playback unit 104 as the input image data and acquires the audio data output from the record/playback unit 104 as the input audio data in a period in which the playback processing is performed. The data processing unit 110 acquires the image data output from the signal processing unit 103 as the input image data and acquires the audio data output from the signal processing unit 103 as the input audio data in a period in which the playback processing is not performed. In this example, when the user performs the playback operation for the image pickup apparatus, the control unit 101 instructs the record/playback unit 104 to execute the playback processing, and the record/playback unit 104 performs the playback processing. The input image data is imaged image data (data of a captured image; image data representing an image of an object). The input image data may be still image data or moving image data.

The data processing unit 110 generates at least screen data (image data) representing the screen to be displayed on the liquid-crystal display unit 105. The screen represented by the screen data includes at least one image. The data processing unit 110 outputs the screen data to the display processing unit 111.

For example, the data processing unit 110 performs predetermined data processing on the acquired digital data. The predetermined data processing includes processing for the input image data, processing for the input audio data, or both. The predetermined data processing includes format conversion processing for converting the data format of the digital data, resize processing for converting the image size of the input image data, and combination processing for combining graphic image data with the input image data, for example. The graphic image data is on screen display (OSD)

image data representing a menu image, for example. The data processing unit 110 outputs the image data after the predetermined data processing to the display processing unit 111 as the screen data, and outputs the audio data after the predetermined data processing to a speaker. The speaker emits audio corresponding to audio data output to the speaker. The data processing unit 110 can also generate the screen data without the use of the input image data.

The data processing unit 110 can output the digital data (the image data and the audio data) output from the signal processing unit 103 to the record/playback unit 104. In this example, when the user performs the record operation for the image pickup apparatus, the control unit 101 instructs the record/playback unit 104 to execute the record processing, and the data processing unit 110 outputs the digital data output from the signal processing unit 103 to the record/playback unit 104. Then, the record/playback unit 104 performs the record processing.

The display processing unit 111 performs processing based on the set display mode. Then, the display processing unit 111 outputs the image data after the abovementioned processing (the processing based on the set display mode) to the liquid-crystal panel 107. The image data output to the liquid-crystal panel 107 is image data based on the screen data output from the data processing unit 110. Therefore, the screen based on the screen data is displayed on the liquid-crystal display unit 105.

The power source operation unit 112 is an operation unit (a switch and the like) capable of receiving a startup operation for instructing the startup of the image pickup apparatus and a shutdown operation for instructing the shutdown of the image pickup apparatus. The startup operation can be said to be "an operation for instructing the switching from the OFF state to the ON state (the switching of the power source state of the image pickup apparatus)", and the shutdown operation can be said to be "an operation for instructing the power source state to be switched from the ON state to the OFF state". When the user performs the startup operation for the image pickup apparatus, the control unit 101 performs startup processing for starting up the image pickup apparatus. When the user performs the shutdown operation for the image pickup apparatus, the control unit 101 performs shutdown processing for shutting down the image pickup apparatus.

The operation unit 113 is an operation unit (switch and the like) capable of receiving various operations for the image pickup apparatus. For example, the operation unit 113 can receive the mode setting operation, the mode release operation, the record operation, the playback operation, and the like. The operations receivable by the operation unit 113 may be the same as or different from the operations receivable by the touch panel 106.

The memory 114 temporarily stores data and the like used in the processing of the control unit 101.

The HDR assistance mode detection unit 115 detects the settings of an HDR assistance mode. The HDR assistance mode detection unit 115 outputs the detection result of the settings of the HDR assistance mode to the display processing unit 111. In other words, the HDR assistance mode detection unit 115 determines whether the HDR assistance mode is set. Then, the HDR assistance mode detection unit 115 outputs the determination result of whether the HDR assistance mode is set to the display processing unit 111.

Figure 4A:
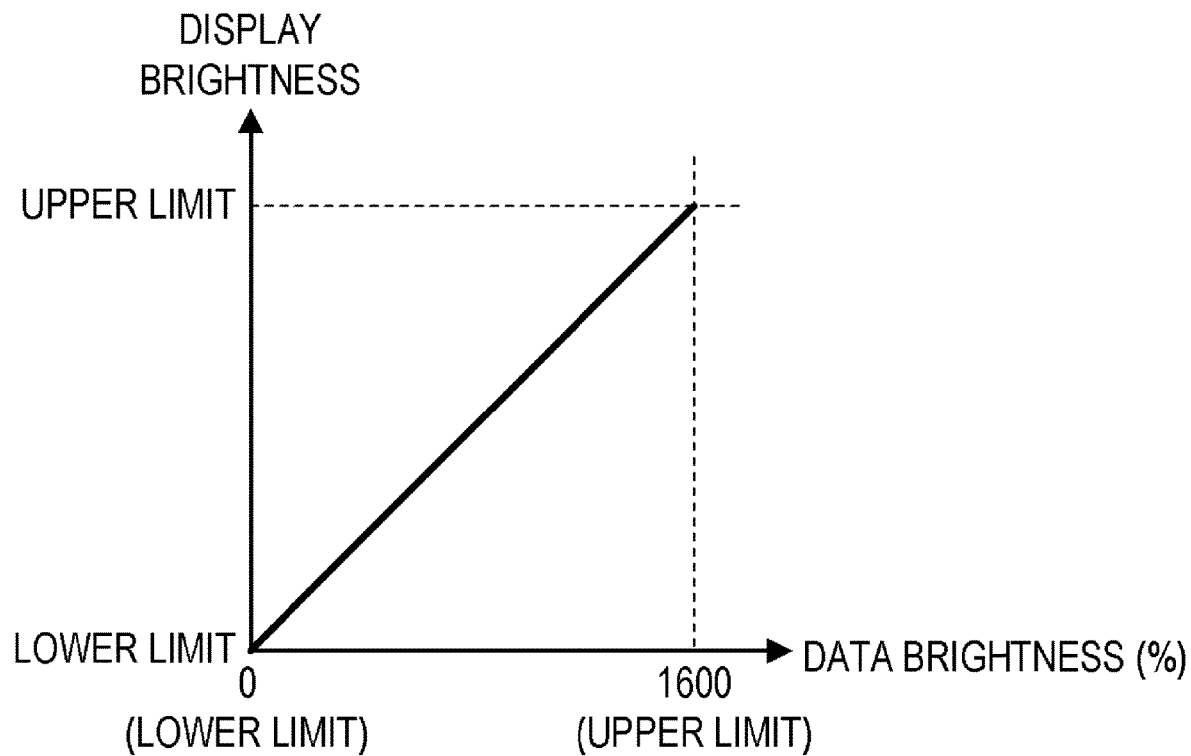
FIG. 4A is a diagram illustrating an example of an input-output characteristic according to Example 1.

The HDR assistance mode is a display mode for suppressing the reduction of the gradation of an image of the input image data and displaying the image based on the input image data on the liquid-crystal display unit 105. In this example, display having the correspondence relationship illustrated in FIG. 4A is realized as display (HDR assistance display) in the HDR assistance mode. FIG. 4A illustrates a correspondence relationship between the data brightness of the input image data and the display brightness of the liquid-crystal display unit 105. The data brightness is a brightness determined depending on the exposure (exposure amount) of the image pickup apparatus, a brightness supposed by the image data, and the like. The correspondence relationship between the data brightness of the input image data and the display brightness of the liquid-crystal display unit 105 can be said to be "an input-output characteristic of the display apparatus", "an input-output characteristic of the liquid-crystal display unit 105", and the like. In the input-output characteristic in FIG. 4A, the display brightness of the liquid-crystal display unit 105 linearly increases from the lower-limit display brightness to the upper-limit display brightness as the data brightness of the input image data increases from the lower-limit data brightness to the upper-limit data brightness. The lower-limit data brightness is the lower limit of the data brightness, the upper-limit data brightness is the upper limit of the data brightness, the lower-limit display brightness is the lower limit of the display brightness, and the upper-limit display brightness is an upper-limit of the display brightness. The HDR assistance mode is set when the user checks the gradation of an image in the entire dynamic range (a data brightness range that is at least the lower-limit data brightness and not more than the upper-limit data brightness) of the input image data, for example.

The input-output characteristic of the liquid-crystal display unit 105 in the HDR assistance mode is not limited to the input-output characteristic in FIG. 4A. For example, in the input-output characteristic in the HDR assistance mode, the lower-limit data brightness of the input image data may correspond to a display brightness different from the lower-limit display brightness of the liquid-crystal display unit 105. In the input-output characteristic in the HDR assistance mode, the upper-limit data brightness of the input image data may correspond to a display brightness different from the upper-limit display brightness of the liquid-crystal display unit 105. In at least a part of the dynamic range of the input image data, the display brightness of the liquid-crystal display unit 105 may non-linearly change as the data brightness of the input image data changes. FIG. 4A illustrates a relative brightness with respect to a predetermined brightness as the data brightness, but the data brightness may be an absolute brightness.

The screen determination unit 116 determines the screen to be displayed on the liquid-crystal display unit 105, and outputs the determination result of the screen to the control unit 101 (the display processing unit 111 and the like). In this example, the data processing unit 110 generates screen data corresponding to the set screen mode. Therefore, the screen to be displayed on the liquid-crystal display unit 105 is determined depending on the set screen mode. The screen determination unit 116 determines the set screen mode, and outputs the determination result of the screen mode to the control unit 101 (the display processing unit 111 and the like).

The determination method of the screen to be displayed on the liquid-crystal display unit 105 is not particularly limited. For example, the screen determination unit 116 may determine the screen on the basis of the operation performed for the image pickup apparatus (display apparatus) by the user, the processing performed in the data processing unit 110, and the like. When the display apparatus is an apparatus separate from the image pickup apparatus, the image pickup apparatus may generate screen data and the display apparatus may acquire the screen data as the input image data. In that case, the screen determination unit 116 may determine the screen by analyzing the input image data (screen data) or by acquiring information of the screen (screen mode) from the image pickup apparatus and analyzing the information.

Figure 10:
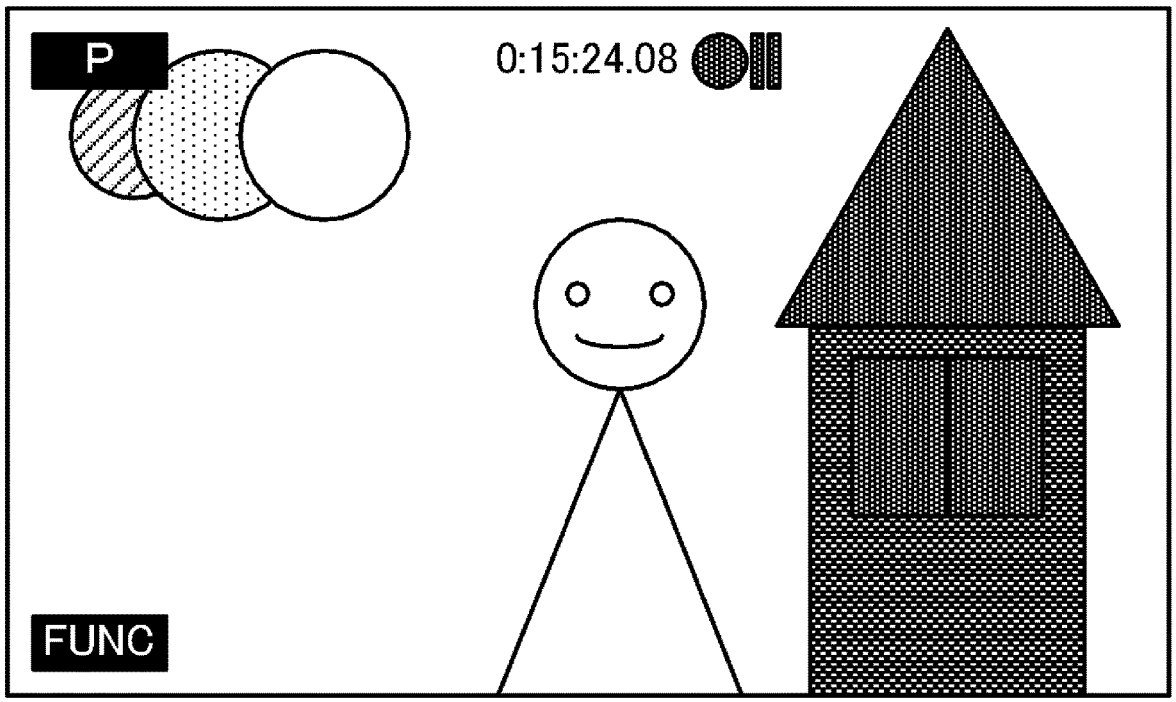
FIG. 10 is a diagram illustrating an example of a first screen according to Example 1.
Figure 11:
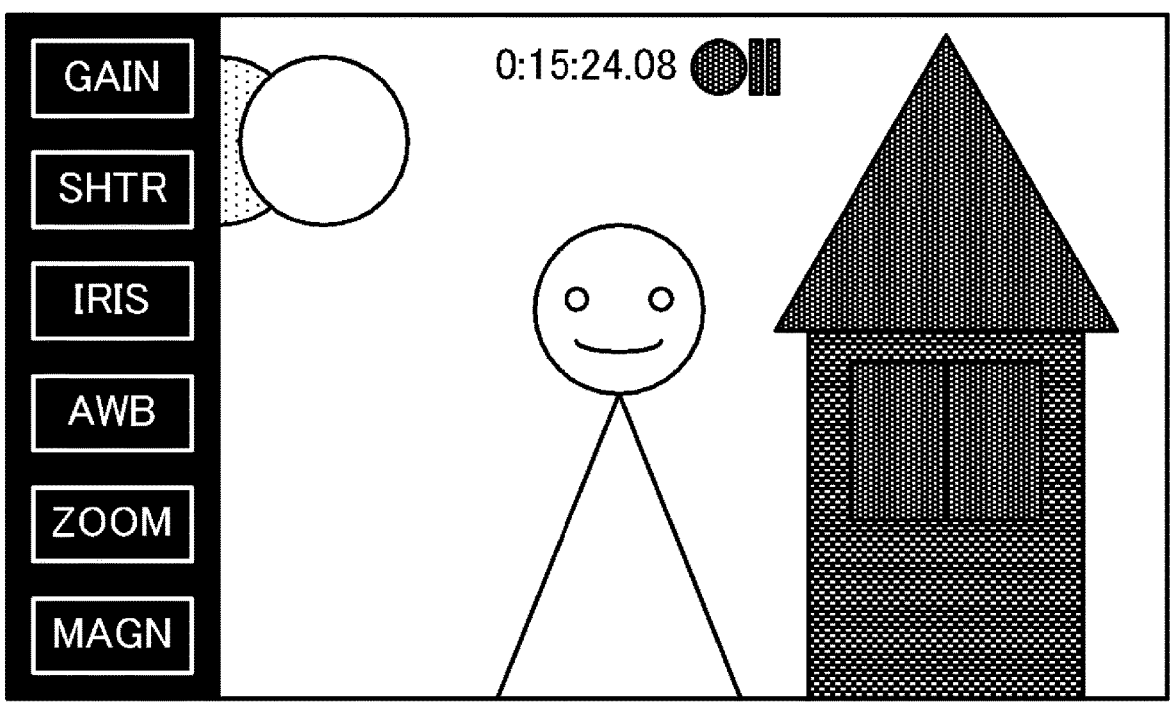
FIG. 11 is a diagram illustrating an example of a second screen according to Example 1.
Figure 12:
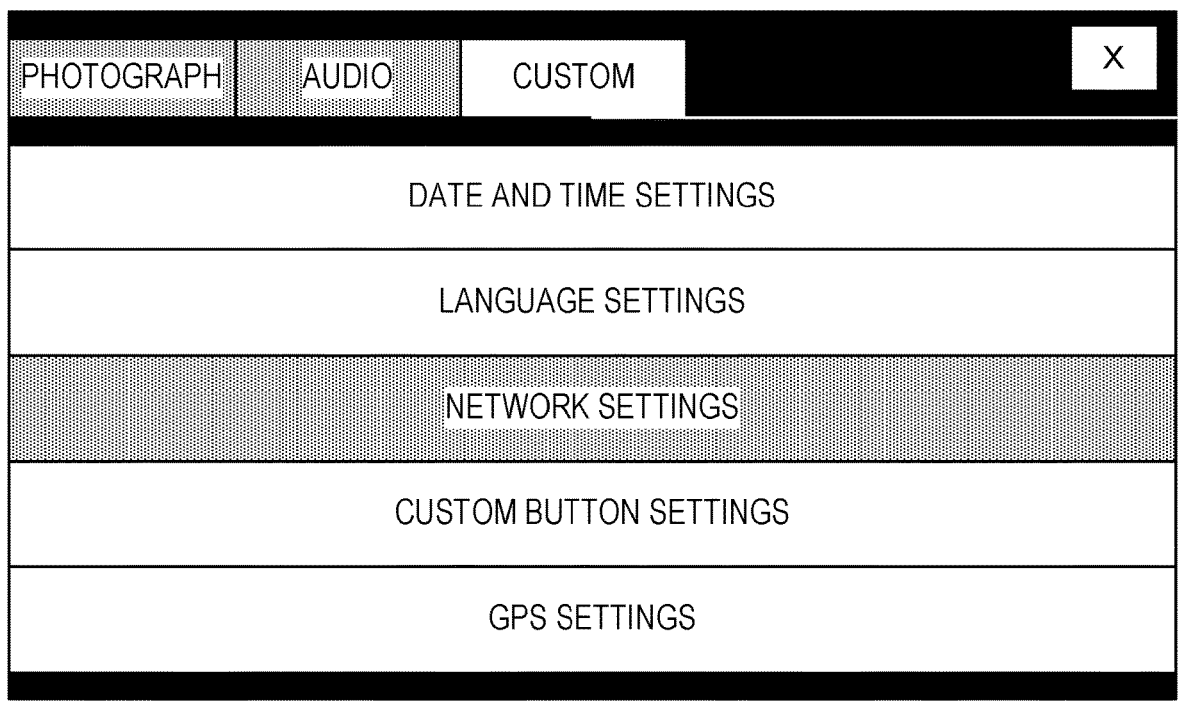
FIG. 12 is a diagram illustrating an example of a third screen according to Example 1.

In this example, one of a first screen mode for displaying a first screen on the liquid-crystal display unit 105, a second screen mode for displaying a second screen on the liquid-crystal display unit 105, and a third screen mode for displaying a third screen on the liquid-crystal display unit 105 is set. The first screen is a screen including a captured image (an image represented by the input image data; an image of an object). For example, the first screen is a screen for checking an object such as a screen indicating a pause in photographing, a screen indicating a photographing state, and the like. FIG. 10 illustrates an example of the first screen. The second screen is a screen including the captured image and a first graphic image. For example, the first graphic image is a menu image, and the second screen a screen for setting various kinds of settings (the change of shutter speed, the change of white balance, and the like) while checking the captured image. FIG. 11 illustrates an example of the second screen. The third screen is a screen not including the captured image and including a second graphic image. For example, the second graphic image is a menu image, and the third screen is a screen for setting various kinds of settings without checking the captured image. FIG. 12 illustrates an example of the third screen.

The first graphic image and the second graphic image are not limited to the menu images. For example, the first graphic image and the second graphic image may be images representing various kinds of information (the operation method, caution, and the like). The dynamic ranges of the captured image, the first graphic image, and the second graphic image (the dynamic ranges of the image data) are not particularly limited. In this example, the dynamic range of the captured image is wider than the dynamic range of the first graphic image and the dynamic range of the second graphic image.

In this example, when the HDR assistance mode is set, the control unit 101 performs brightness control that controls the upper-limit display brightness of the liquid-crystal display unit 105 so as to satisfy the following conditions 1-1 and 1-2 on the basis of the determination result of the screen determination unit 116.

Condition 1-1: The upper-limit display brightness for when the screen determination unit 116 determines that the second screen is to be displayed is lower than the upper-limit display brightness for when the screen determination unit 116 determines that the first screen is to be displayed.

Condition 1-2: The upper-limit display brightness for when the screen determination unit 116 determines that the third screen is to be displayed is lower than the upper-limit display brightness for when the screen determination unit 116 determines that the second screen is to be displayed.

Figure 9:
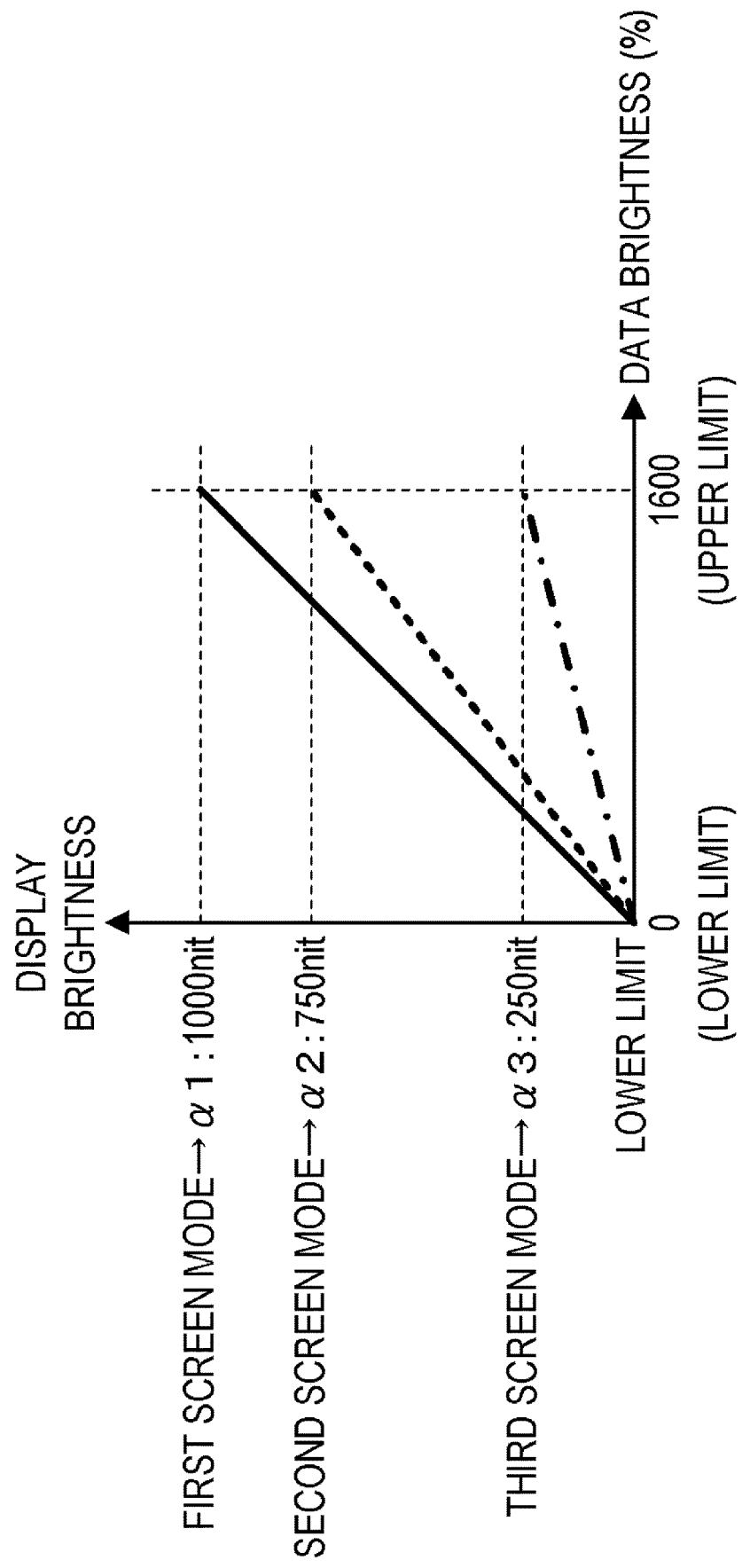
FIG. 9 is a diagram illustrating an example of the input-output characteristic according to Example 1.

Specifically, as illustrated in FIG. 9, when the HDR assistance mode and the first screen mode are set, the control unit 101 controls the upper-limit display brightness of the liquid-crystal display unit 105 to be an upper-limit display brightness α1. When the HDR assistance mode and the second screen mode are set, the control unit 101 controls the upper-limit display brightness of the liquid-crystal display unit 105 to be an upper-limit display brightness α2 lower than the upper-limit display brightness α1. When the HDR assistance mode and the third screen mode are set, the control unit 101 controls the upper-limit display brightness of the liquid-crystal display unit 105 to be an upper-limit display brightness α3 lower than the upper-limit display brightness α2. In this example, as illustrated in FIG. 9, the upper-limit display brightness α1 is 1000 nits, the upper-limit display brightness α2 is 750 nits, and the upper-limit display brightness α3 is 250 nits.

The upper-limit display brightness α1 and α2, and α3 is not particularly limited. At least one of the condition 1-1 or 1-2 does not necessarily need to be satisfied. For example, an upper-limit display brightness equal to the upper-limit display brightness α3 and lower than the upper-limit display brightness α1 may be used as the upper-limit display brightness α2 so that only the condition 1-1 is satisfied. An upper-limit display brightness equal to the upper-limit display brightness α1 and higher than the upper-limit display brightness α3 may be used as the upper-limit display brightness α2 so that only the condition 1-2 is satisfied. The upper-limit display brightness α1, α2, and α3 may be a predetermined fixed brightness or a brightness changeable by the user.

Figure 2:
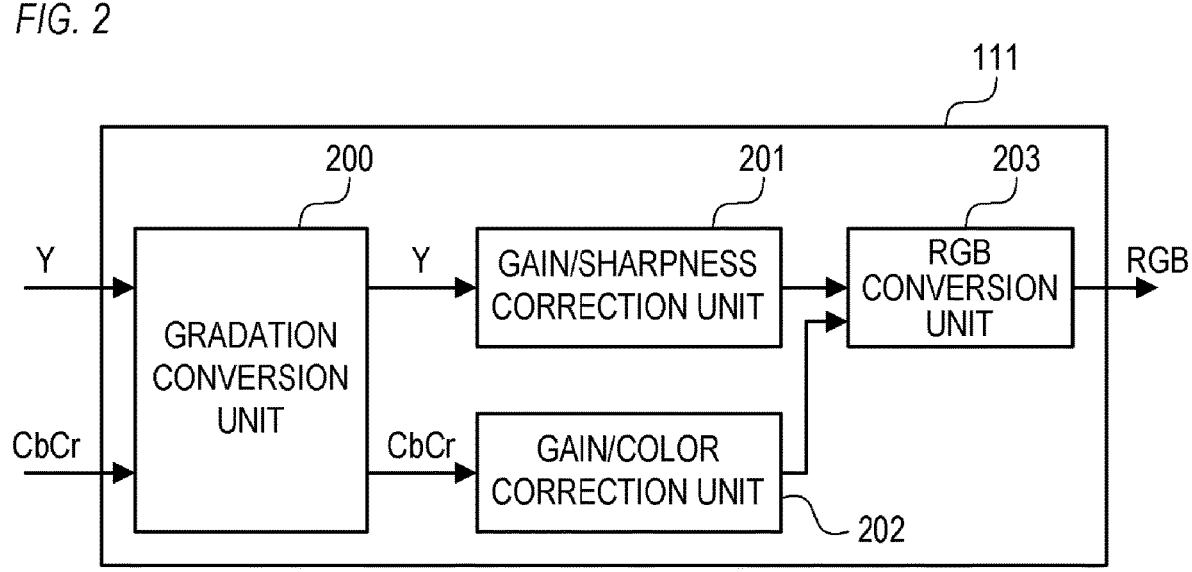
FIG. 2 is a diagram illustrating a configuration example of a display processing unit according to Example 1.

The configuration of the display processing unit 111 is described with reference to FIG. 2. FIG. 2 illustrates a configuration example of the display processing unit 111. The data format of the screen data is not particularly limited, but YCbCr data (YCbCr data before being converted) is output from the data processing unit 110 to a gradation conversion unit 200 as the screen data in this example. The YCbCr data is image data in which the pixel values are YCbCr values (a combination of an Y value, a Cr values, and a Cb value).

The gradation conversion unit 200 generates the converted YCbCr data by converting the gradation values of the YCbCr data before being converted. In this example, the gradation conversion unit 200 converts the YCbCr values of the YCbCr data before being converted with use of a three-dimensional lookup table (3DLUT) indicating a correspondence relationship between the YCbCr values of the YCbCr data before being converted and the YCbCr values of the converted YCbCr data. The gradation conversion unit 200 outputs the converted YCbCr data to a gain/sharpness correction unit 201 and a gain/color correction unit 202. Specifically, the gradation conversion unit 200 outputs the brightness data (Y values) included in the converted YCbCr data to the gain/sharpness correction unit 201, and outputs color difference data (the Cb values and the Cr values) included in the converted YCbCr data to the gain/color correction unit 202. The conversion method of the gradation value is not particularly limited. For example, the gradation conversion unit 200 may use a function indicating a correspondence relationship between values before being converted (the gradation value, the pixel value, and the like) and converted values instead of a lookup table.

The gain/sharpness correction unit 201 generates processing brightness data by performing predetermined processing on the brightness data included in the converted YCbCr data. The predetermined processing includes gain adjustment processing for adjusting a gradation value and sharpness correction processing for enhancing the edges, for example. The gain/sharpness correction unit 201 outputs the processing brightness data to an RGB conversion unit 203.

The gain/color correction unit 202 generates processing color-difference data by performing predetermined processing on the color difference data included in the converted YCbCr data. The predetermined processing includes the gain adjustment processing and color correction processing for adjusting colors (chroma, hue, and the like), for example.

The gain/color correction unit 202 outputs the processing color-difference data to the RGB conversion unit 203.

The RGB conversion unit 203 converts the combination of the processing brightness data and the processing color-difference data (the YCbCr data in which the pixel values are combinations of the Y value of processing image data, the Cb value of the processing color-difference data, and the Cr value of the processing color-difference data) to RGB data. The RGB data is image data in which the pixel values are RGB values (a combination of an R value, a G value, and a B value). For example, the RGB conversion unit 203 converts the YCbCr data to the RGB data by one-dimensional matrix operation processing. Then, the RGB conversion unit 203 outputs the RGB data to the liquid-crystal panel 107.

Figure 3:
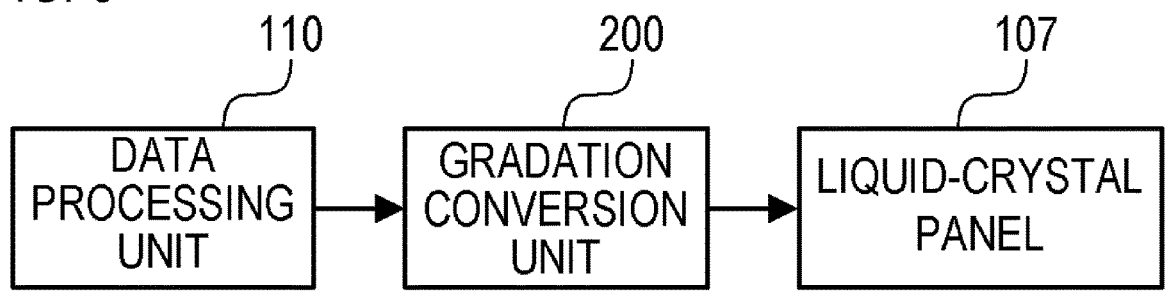
FIG. 3 is a diagram illustrating an example of a functional unit relating to gradation conversion processing according to Example 1.

In this example, the gradation conversion processing for converting the input-output characteristic of the liquid-crystal display unit 105 is realized by performing at least the processing of the gradation conversion unit 200. An example of the gradation conversion processing (the gradation conversion processing when the HDR assistance mode is set and the gradation conversion processing when the HDR assistance mode is not set) according to this example is described. FIG. 3 illustrates an example of a functional unit relating to the gradation conversion processing. As illustrated in FIG. 3, the screen data is output from the data processing unit 110 to the gradation conversion unit 200 in this example. The gradation conversion unit 200 converts the gradation values of the screen data. Then, the image data in which the gradation values are converted is output to and displayed on the liquid-crystal panel 107.

Figure 4B:
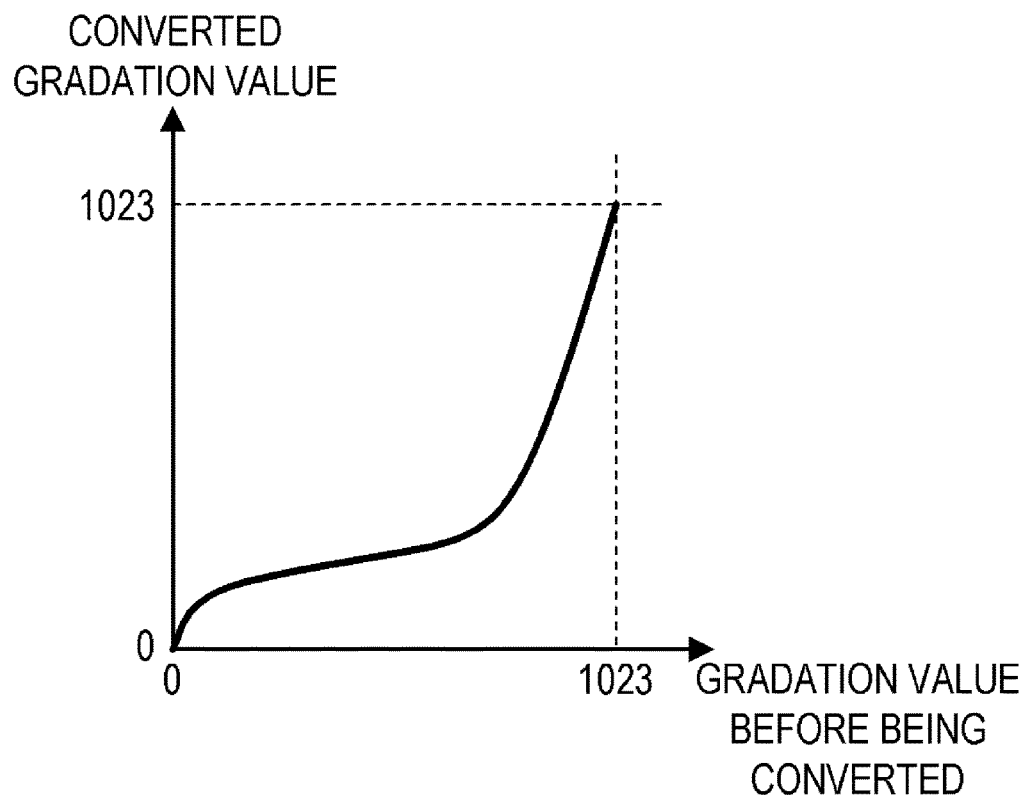
FIG. 4B is a diagram illustrating an example of a conversion characteristic according to Example 1.

The gradation conversion processing when the HDR assistance mode is set includes the abovementioned brightness control, but the gradation conversion processing is described here without the brightness control. When the HDR assistance mode is set, the control unit 101 performs gradation conversion processing (first gradation conversion processing) for suppressing the reduction of the gradation of an image of the input image data and displaying the image based on the input image data on the liquid-crystal display unit 105. In this example, the control unit 101 performs gradation conversion processing for realizing display with the input-output characteristic illustrated in FIG. 4A as the first gradation conversion processing. Specifically, the gradation conversion unit 200 converts the gradation values of the screen data with use of an LUT (3DLUT) 1 indicating conversion characteristic in FIG. 4B (the gradation value before being converted and the converted gradation value). The input-output characteristic of the liquid-crystal display unit 105 becomes the input-output characteristic illustrated in FIG. 4A by inputting the image data converted with the conversion characteristic illustrated in FIG. 4B to the liquid-crystal panel 107. FIG. 4B illustrates an example in which the gradation value before being converted and the converted gradation value are 10-bit values (at least 0 and not more than 1023), but the bit number of those gradation values are not particularly limited.

The liquid-crystal panel 107 has characteristics including a gamma characteristic of gamma 2.2 and the like and a change due to individual variation at the time of manufacture, for example. The conversion characteristic in FIG. 4B is determined in consideration of the characteristic of the liquid-crystal panel 107. The conversion characteristic in FIG. 4B can be said to be "a conversion characteristic corresponding to the reverse characteristic (a characteristic similar to a reverse gamma characteristic) of the characteristic of the liquid-crystal panel 107".

Figure 5:
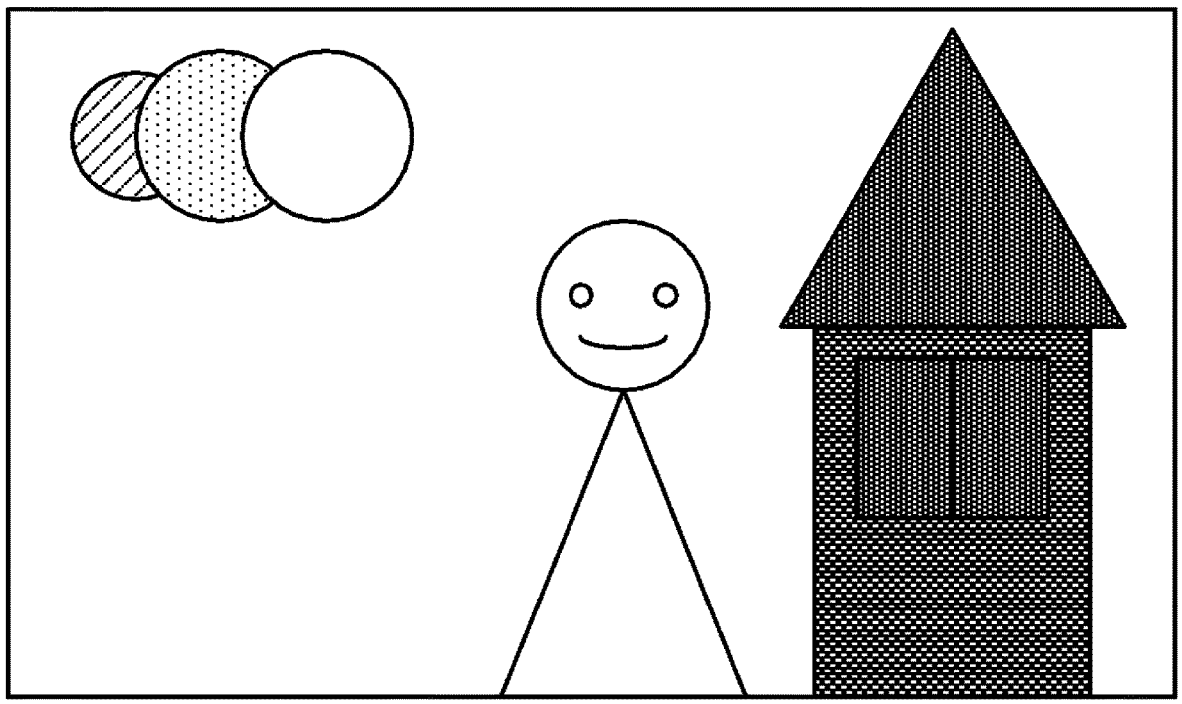
FIG. 5 is a diagram illustrating an example of a display image according to Example 1.

FIG. 5 illustrates an example of a display image (an image displayed on the screen) when the first gradation conversion processing is performed. As illustrated in FIG. 5, an image in which the gradation crush is suppressed is displayed when the first gradation conversion processing is performed. The user can check the gradation of an image from low brightness to high brightness with high precision (easily). Therefore, the first gradation conversion processing is gradation conversion processing preferable when the user checks the gradation of an image in the entire dynamic range of the input image data. Almost all the data brightness included in the input image data is at least 0% and not more than 100%. Therefore, when the first gradation conversion processing is performed, an overall dark image is displayed if the upper-limit display brightness is not high to a certain degree.

When the HDR assistance mode is not set, a standard mode is set. The standard mode is a display mode suitable for checking an SDR image quality with the non-HDR (SDR) liquid-crystal panel 107, for example. When the standard mode is set, the control unit 101 performs gradation conversion processing (second gradation conversion processing) for displaying an image based on the input image data with an input-output characteristic having more fidelity to the input image data on the liquid-crystal display unit 105. In this example, the control unit 101 performs gradation conversion processing for realizing display with the input-output characteristic illustrated in FIG. 7A as the second gradation conversion processing. Specifically, the gradation conversion unit 200 converts the gradation values of the screen data with use of an LUT 2 (for example, a 3DLUT conforming to the BT.709 standard) different from the LUT 1. In this example, the LUT 2 indicates the conversion characteristic in FIG. 7B. The input-output characteristic of the liquid-crystal display unit 105 becomes the input-output characteristic illustrated in FIG. 7A by inputting the image data converted with the conversion characteristic illustrated in FIG. 7B to the liquid-crystal panel 107. The conversion characteristic in FIG. 7B is also determined in consideration of the characteristic of the liquid-crystal panel 107.

Figure 6:
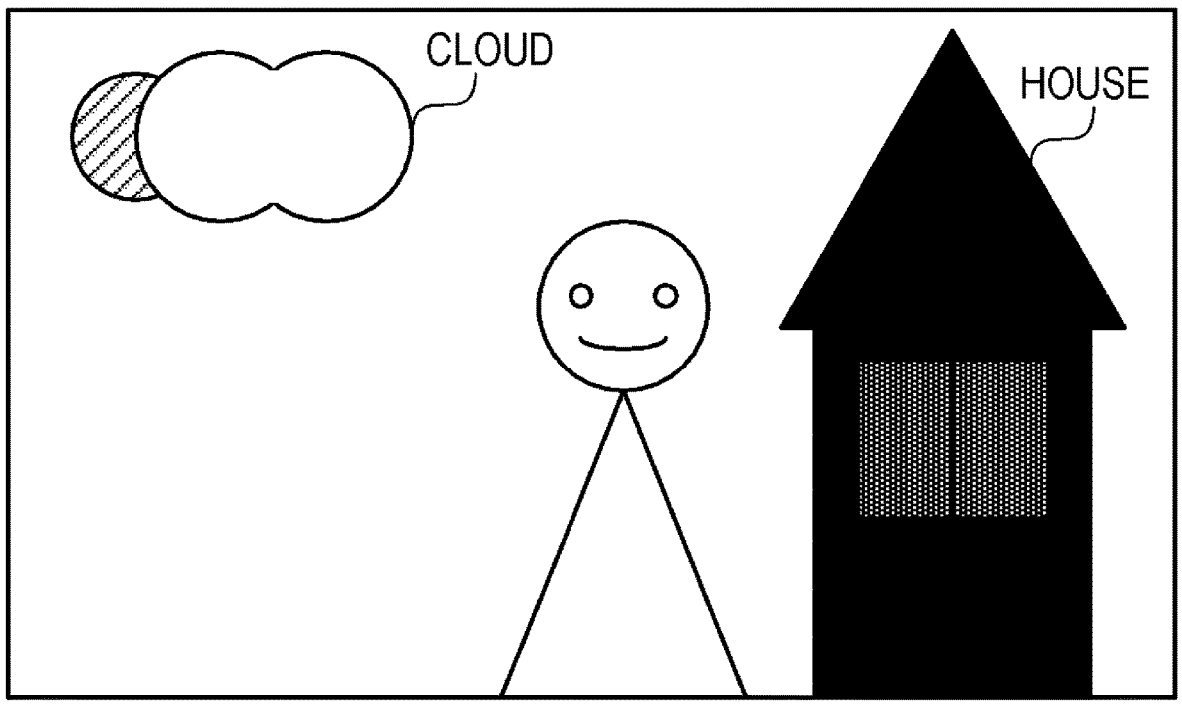
FIG. 6 is a diagram illustrating an example of a display image according to Example 1.

FIG. 6 illustrates an example of a display image when the second gradation conversion processing is performed. When the second gradation conversion processing is performed, gradation crush occurs if the data brightness of the screen data is in a low data brightness range or when the data brightness of the screen data is in a high data brightness range, for example. In the example in FIG. 6, the gradation crush occurs in an image area of a cloud and an image area of a house.

Figure 7A:
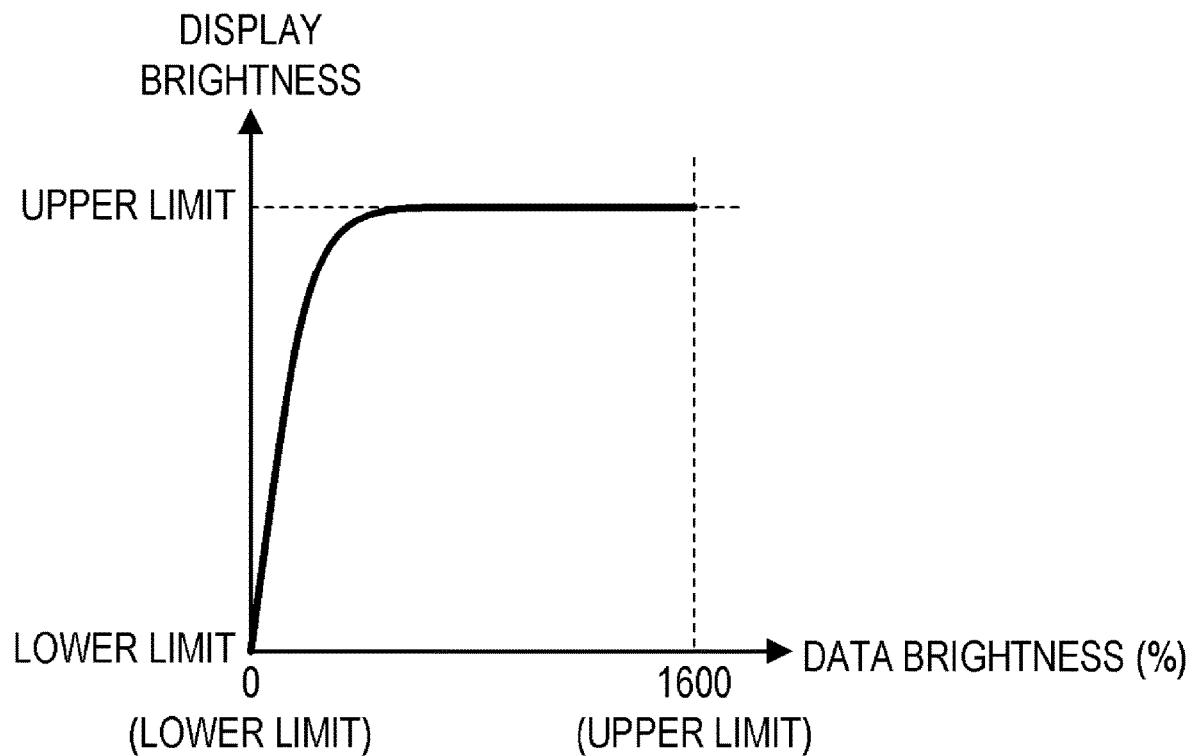
FIG. 7A is a diagram illustrating an example of the input-output characteristic according to Example 1.
Figure 7B:
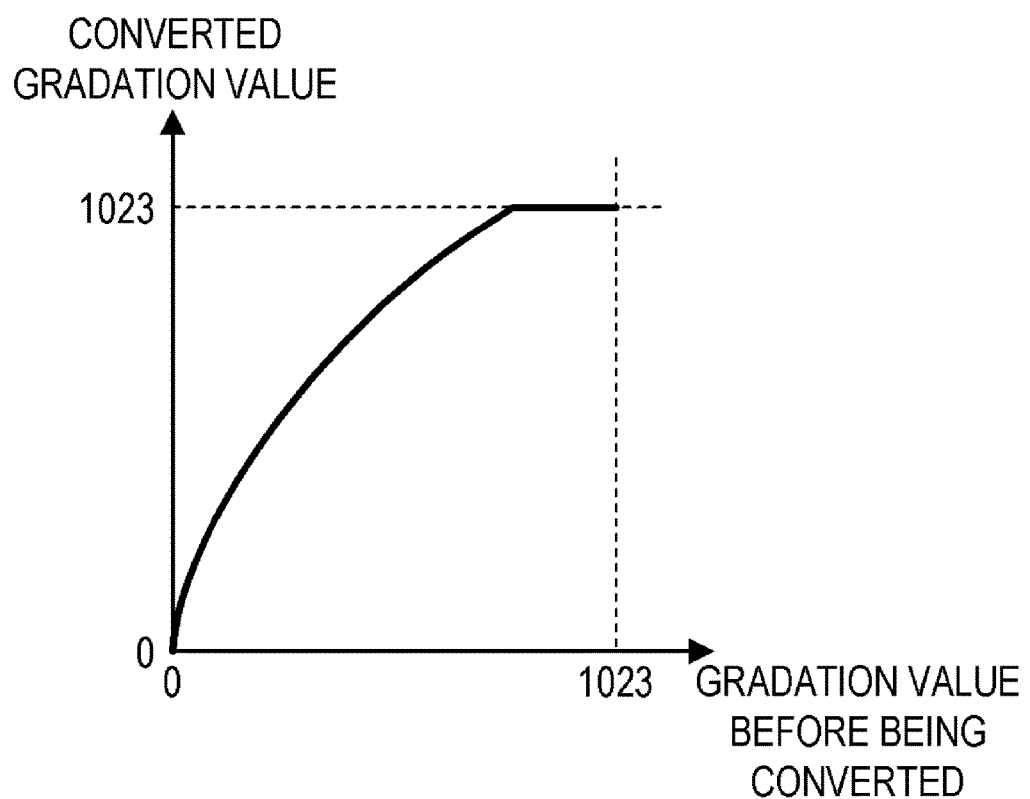
FIG. 7B is a diagram illustrating an example of the conversion characteristic according to Example 1.

In the input-output characteristic in FIG. 7A, more display brightness is associated with the low-data-brightness side than the high-data-brightness side. However, the input-output characteristic of the second gradation conversion processing is not limited to the input-output characteristic in FIG. 7A. For example, more display brightness may be associated with a range of intermediate data brightness (data brightness that is neither high nor low) than the range of other data brightness. When the HDR assistance mode is not set, the gradation conversion processing may be omitted.

Figure 8:
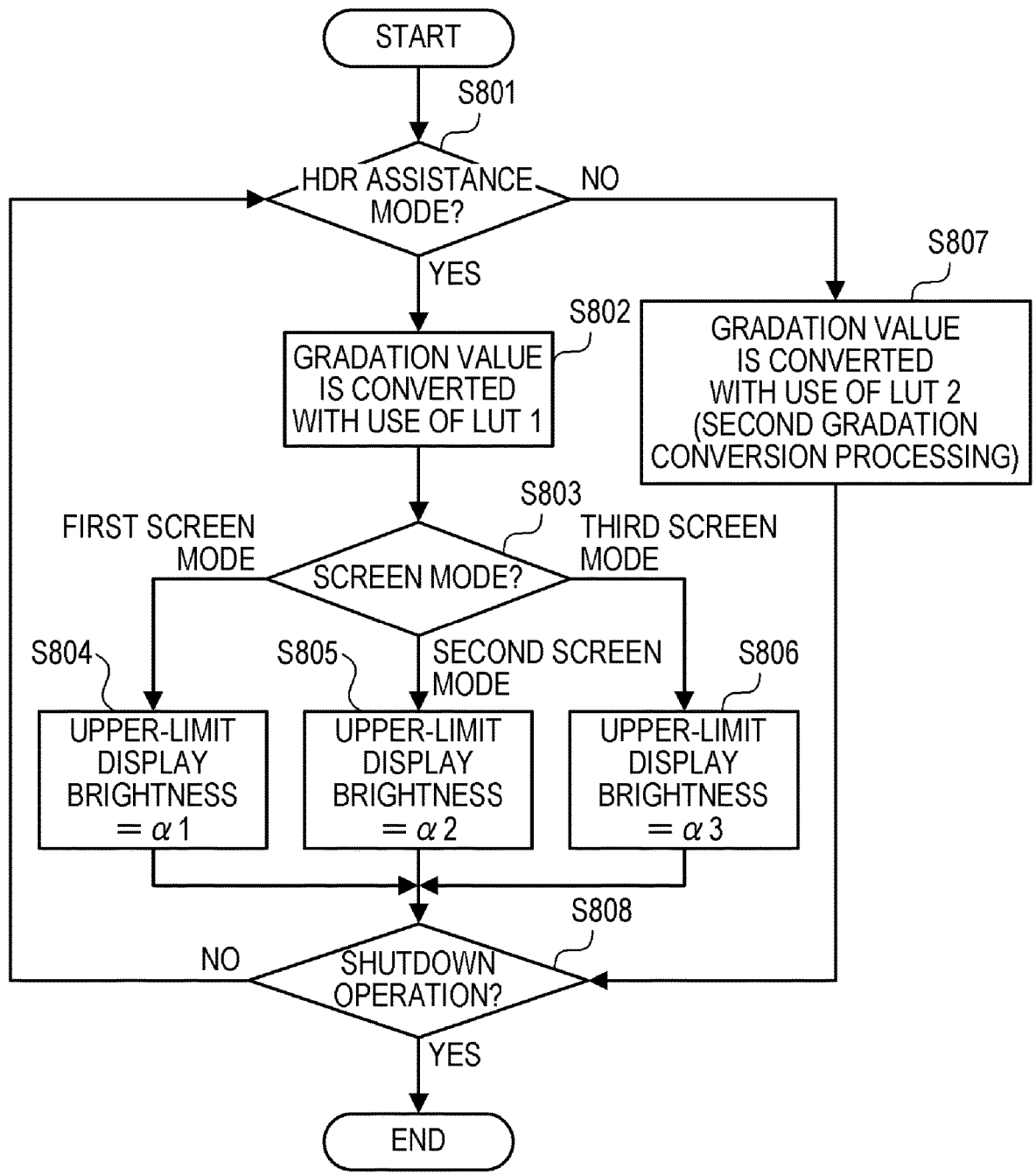
FIG. 8 is a diagram illustrating an example of a processing flow according to Example 1.

An example of a processing flow of the image pickup apparatus according to this example is described with reference to FIG. 8. FIG. 8 is a flowchart illustrating an example of the processing flow of the image pickup apparatus according to this example. The processing flow in FIG. 8 is executed in accordance with the startup operation using the power source operation unit 112 and the record operation using the operation unit 113, for example.

In Step S801, the HDR assistance mode detection unit 115 determines whether the HDR assistance mode is set. When the HDR assistance mode is set, processing proceeds to Step S802. When the HDR assistance mode is not set, the processing proceeds to Step S807.

In Step S802, the display processing unit 111 (the gradation conversion unit 200) converts the gradation values of the screen data with use of the LUT 1 (FIG. 4B). Then, the processing proceeds to Step S803. In Step S807, the display processing unit 111 (the gradation conversion unit 200) converts the gradation values of the screen data with use of the LUT 2 (FIG. 7B). Then, the processing proceeds to Step S808.

In Step S803, the screen determination unit 116 determines what the set screen mode is. When it is determined that the first screen mode (FIG. 10) is set, the processing proceeds to Step S804. When it is determined that the second screen mode (FIG. 11) is set, the processing proceeds to Step S805. When it is determined that the third screen mode (FIG. 12) is set, the processing proceeds to Step S805.

In Step S804, the control unit 101 controls the light emission brightness of the backlight unit 108 to be a light emission brightness $\beta1$ ($\approx\alpha1$). Then, the processing proceeds to Step S808. The upper-limit display brightness of the liquid-crystal display unit 105 is controlled to be an upper-limit display brightness $\alpha1=1000$ nits by the processing in Step S804. As a result, an input-output characteristic 901 (solid line) in FIG. 9 is realized as the input-output characteristic of the liquid-crystal display unit 105. As a result, display suitable for the user is realized. When the first screen is displayed, the possibility of the user checking the captured image is extremely high. The gradation of an image in the entire dynamic range of the input image data is easier to check when the display image is bright as compared to when the display image is dark. The upper-limit display brightness $\alpha1$ is high, and hence the first screen is displayed with high brightness by the processing in Step S804 and display in which the gradation of an image in the entire dynamic range of the input image data (captured image) is easily checked is realized.

In Step S805, the control unit 101 controls the light emission brightness of the backlight unit 108 to be a light emission brightness $\beta2$ ($\approx\alpha2$). Then, the processing proceeds to Step S808. The upper-limit display brightness of the liquid-crystal display unit 105 is controlled to be the upper-limit display brightness $\alpha2=750$ nits by the processing in Step S805. As a result, an input-output characteristic 902 (broken line) in FIG. 9 is realized as the input-output characteristic of the liquid-crystal display unit 105. As a result, display suitable for both the user and the image pickup apparatus is realized. When the second screen is displayed, the possibility of the user checking the captured image is not so high. The second screen is displayed with a brightness lower than the brightness of the upper-limit display brightness $\alpha1$ by the processing in Step S805, and hence the increase in the power consumption or the temperature of the image pickup apparatus can be suppressed. The upper-limit display brightness $\alpha2$ is high to a certain degree, and hence the second screen is displayed with a brightness that is high to a certain degree and display in which the gradation of an image in the entire dynamic range of the input image data (captured image) is checked easily to a certain degree is realized.

In Step S806, the control unit 101 controls the light emission brightness of the backlight unit 108 to be a light emission brightness $\beta3$ ($\approx\alpha3$). Then, the processing proceeds to Step S808. The upper-limit display brightness of the liquid-crystal display unit 105 is controlled to be the upper-limit display brightness $\alpha3=250$ nits by the processing in Step S806. As a result, an input-output characteristic 903 (long dashed dotted line) in FIG. 9 is realized as the input-output characteristic of the liquid-crystal display unit 105. As a result, display suitable for both the user and the image pickup apparatus is realized. When the third screen is displayed, the user does not check the captured image. The third screen is displayed with a brightness lower than the brightness of the upper-limit display brightness $\alpha1$ and $\alpha2$ by the processing in Step S806, and hence the increase in the power consumption or the temperature of the image pickup apparatus can be further suppressed. Problems (difficulty in using the image pickup apparatus and the like) for the user are unlikely to occur even when the third screen is displayed with a low brightness because the user does not check the captured image.

The control unit 101 may control the light emission brightness of the backlight unit 108 so that the upper-limit display brightness of the liquid-crystal display unit 105 is instantly switched in accordance with the switching of the screen displayed on the liquid-crystal display unit 105, but does not necessarily need to do so. For example, the control unit 101 may control the light emission brightness of the backlight unit so that the upper-limit display brightness of the liquid-crystal display unit 105 changes from the upper-limit display brightness corresponding to the screen before being switched to the upper-limit display brightness corresponding to the screen after being switched by stages in accordance with the switching of the screen.

In Step S808, the control unit 101 determines whether shutdown operation using the power source operation unit 112 is performed. When the shutdown operation is not performed, the processing is returned to Step S801. The processing in Step S801 to Step S808 is repeated until the shutdown operation is performed. When the shutdown operation is performed, the processing flow is ended.

The determination method of whether the processing flow in FIG. 8 is ended is not particularly limited. For example, the processing in Step S801 to Step S808 may be repeated until a playback ending operation (an operation for instructing the playback processing to be ended) is performed, and the processing flow in FIG. 8 may be ended in accordance with the playback ending operation. The processing in Step S801 to Step S808 may be repeated until a record ending operation (an operation for instructing the record processing to be ended) is performed, and the processing flow in FIG. 8 may be ended in accordance with the record ending operation.

As described above, according to this example, the upper-limit display brightness of the liquid-crystal display unit 105 is controlled on the basis of the determination result of the screen to be displayed on the liquid-crystal display unit 105. As a result, display suitable for the user and the display apparatus can be realized more reliably.

An example in which one of the three screens, that is, the first screen, the second screen, and the third screen is displayed on the liquid-crystal display unit 105 is described, but the number of displayable screens may be more than three. For example, five upper-limit display brightness corresponding to five screens may be preset, and one of the five screens may be displayed on the liquid-crystal display unit 105. Then, the upper-limit display brightness of the liquid-crystal display unit 105 may be controlled to be the upper-limit display brightness corresponding to the screen to be displayed on the liquid-crystal display unit 105.

The predetermined display mode in which the brightness control is performed is not limited to the HDR assistance mode. The control unit 101 may perform the brightness control in a plurality of display modes (predetermined display modes). The control unit 101 may perform the brightness control when a predetermined display mode is set in a state in which another predetermined display mode is set. The control unit 101 may perform the brightness control regardless of whether the predetermined display mode is set.

An example in which the upper-limit display brightness of the liquid-crystal display unit 105 is controlled by the processing for controlling the light emission brightness of the backlight unit 108 is described, but the present invention is not limited thereto. The control unit 101 may control the upper-limit display brightness of the liquid-crystal display unit 105 by processing for converting the gradation values of the screen (screen data) to be displayed on the liquid-crystal display unit 105. The control unit 101 may control the upper-limit display brightness of the liquid-crystal display unit 105 by controlling an LUT of the gradation conversion unit 200. The control unit 101 may control one of the light emission brightness of the backlight unit 108 or the gradation values of the screen data or may control both. When the self-luminous display unit is used instead of the liquid-crystal display unit 105, the control unit 101 controls the upper-limit display brightness of the liquid-crystal display unit 105 by the processing for converting the gradation values of the screen data.

Example 2

Example 2 of the present invention is described below. Features (configurations and processing) different from those in Example 1 are described in detail and the description of the same features as Example 1 is omitted below. In Example 1, an example in which the brightness control is performed on the basis of only the determination result of the screen to be displayed on the liquid-crystal display unit 105 is described. In this example, an example in which the brightness control is performed further on the basis of other determination results is described.

Figure 13:
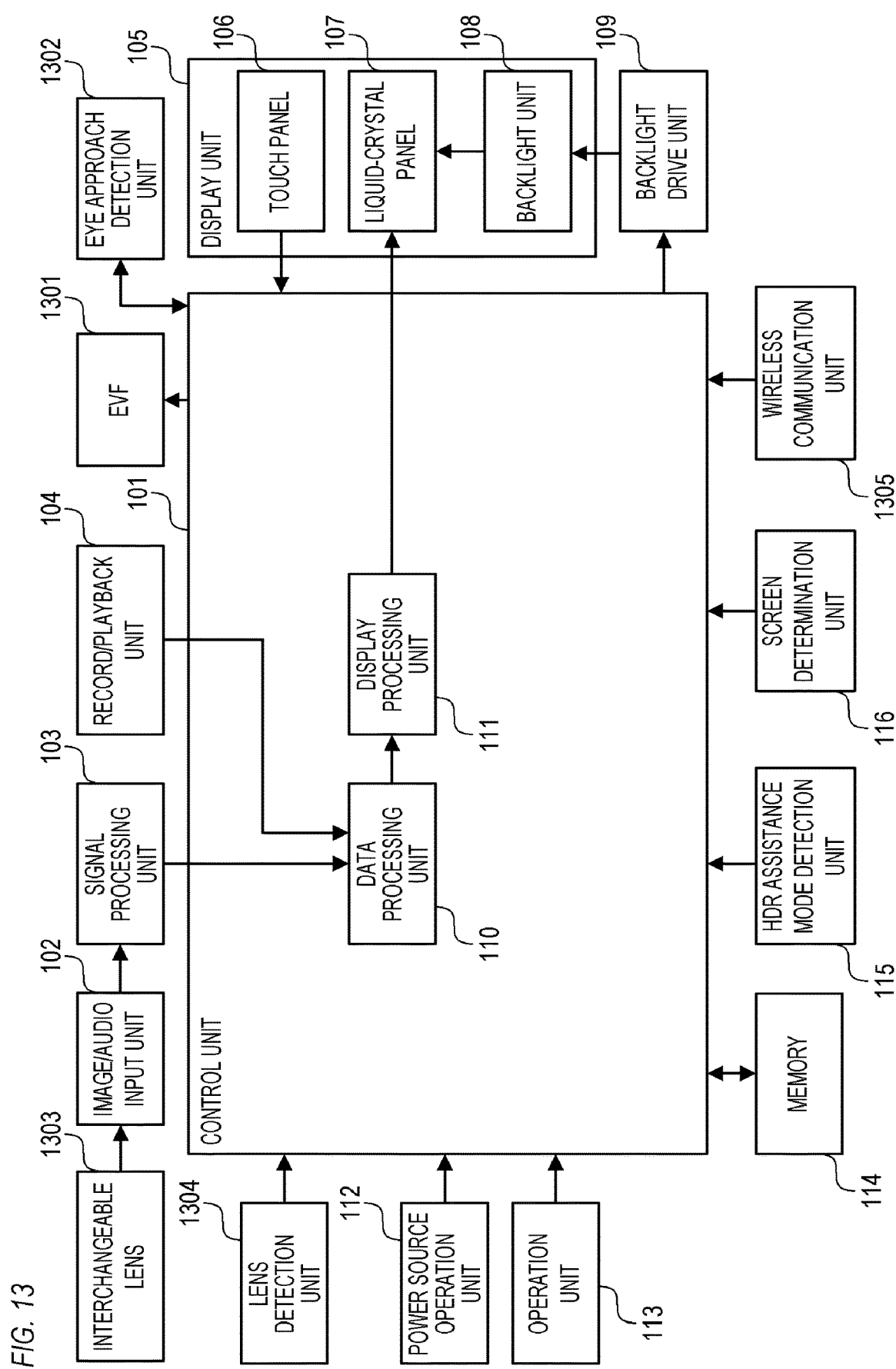
FIG. 13 is a diagram illustrating a configuration example of an image pickup apparatus according to Example 2.

The configuration of an image pickup apparatus according to this example is described with reference to FIG. 13. FIG. 13 illustrates a configuration example of the image pickup apparatus according to this example. In FIG. 13, the same functional units as Example 1 (FIG. 1) are denoted by the same symbols as Example 1. As illustrated in FIG. 13, the image pickup apparatus according to this example further includes an EVF 1301, an eye approach detection unit 1302, an interchangeable lens 1303, a lens detection unit 1304, and a wireless communication unit 1305.

The EVF 1301 is an eyepiece-type EVF (electronic viewfinder). When a photograph mode is set, the EVF 1301 displays a through image (a captured image acquired by image pickup at a timing corresponding to the current timing) and the like. When a playback mode is set, the EVF 1301 playbacks and displays the captured image and the like stored in the storage unit. An optical finder may be used instead of the EVF 1301.

The eye approach detection unit 1302 detects eye approach to the EVF 1301. Specifically, the eye approach detection unit 1302 detects a state in which an object is close to the EVF 1301 as an eye approach state and detects a state in which an object is not close to the EVF 1301 as an eye separation state. That is, the eye approach detection unit 1302 determines whether an object is close to the EVF 1301. Display in the EVF 1301 is performed when the eye approach is detected, and the EVF 1301 is turned off otherwise. When the display apparatus is an apparatus separate from the image pickup apparatus, the EVF 1301 and the eye approach detection unit 1302 are provided in the image pickup apparatus. The display apparatus (the control unit 101) can determine whether an object is close to the EVF 1301 by acquiring the processing result of the eye approach detection unit 1302 from the image pickup apparatus.

The interchangeable lens 1303 is a lens mountable to and removable from the image pickup apparatus. The lens detection unit 1304 detects the mounting of the interchangeable lens 1303 on the image pickup apparatus. That is, the lens detection unit 1304 determines whether the interchangeable lens 1303 is mounted on the image pickup apparatus. When the display apparatus is an apparatus separate from the image pickup apparatus, the interchangeable lens 1303 and the lens detection unit 1304 are provided in the image pickup apparatus. The display apparatus (the control unit 101) can determine whether the interchangeable lens 1303 is mounted on the image pickup apparatus by acquiring the processing result of the lens detection unit 1304 from the image pickup apparatus.

The wireless communication unit 1305 sends and receives data to and from an external apparatus including a wireless communication unit. For example, the wireless communication unit 1305 includes an antenna that sends and receives electric waves. The wireless communication unit 1305 can send the captured image and the like to the external apparatus (for example, a mobile terminal such as a smartphone), and the user can check the captured image and the like displayed on the external apparatus. The control unit 101 can determine whether the captured image is displayed on the external apparatus from the communication state and the like of the wireless communication unit 1305. For example, when the wireless communication unit 1305 has sent the captured image to the external apparatus, the control unit 101 determines that the captured image is displayed on the external apparatus. When the wireless communication unit 1305 has not sent the captured image to the external apparatus, the control unit 101 determines that the captured image is not displayed on the external apparatus. When the display apparatus is an apparatus separate from the image pickup apparatus, the wireless communication unit 1305 is provided in the image pickup apparatus. The display apparatus (the control unit 101) can determine whether the captured image is displayed on the external apparatus by acquiring information on the communication state of the wireless communication unit 1305 from the image pickup apparatus.

Figure 14:
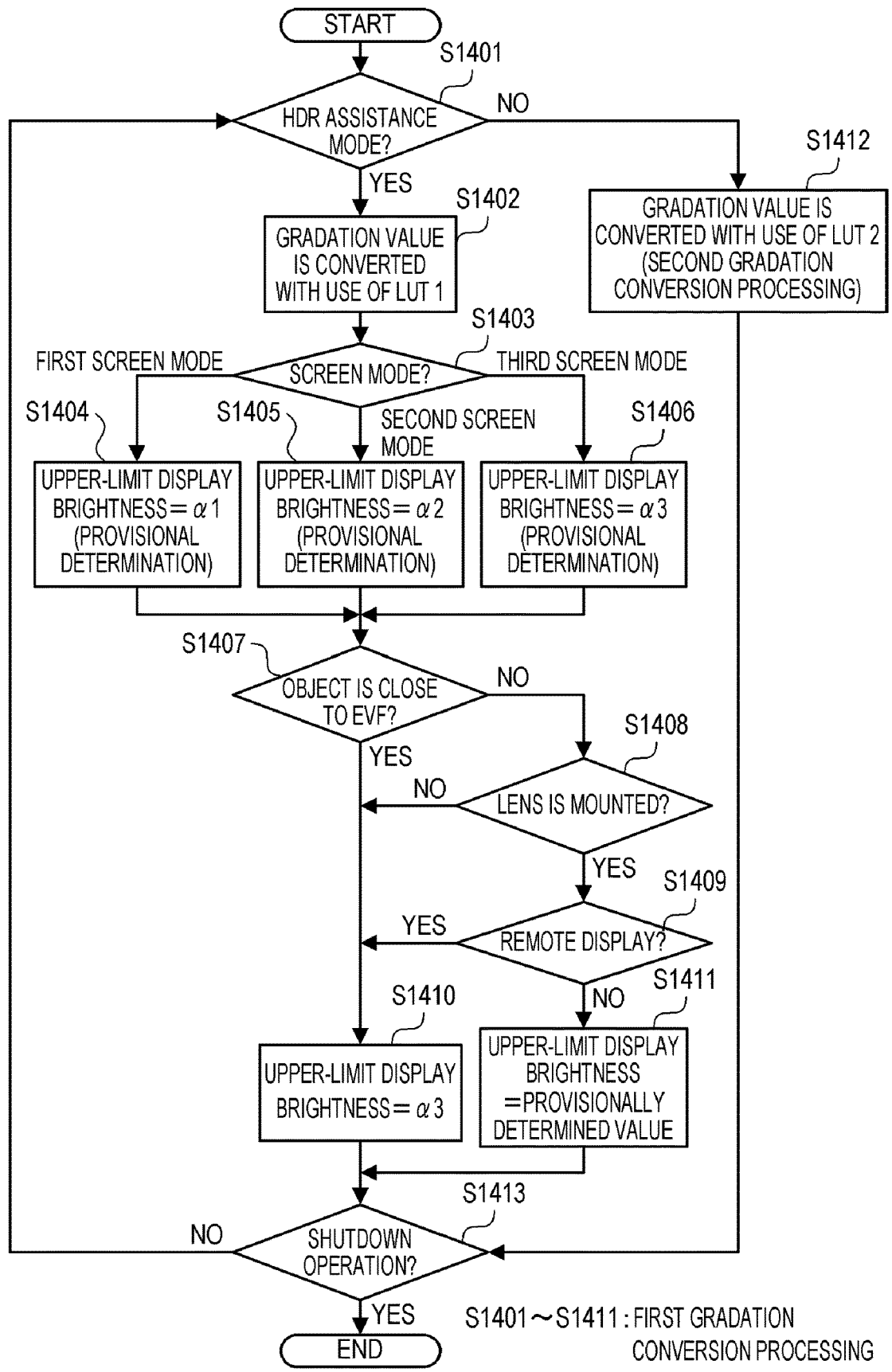
FIG. 14 is a diagram illustrating an example of a processing flow according to Example 2.

An example of a processing flow of the image pickup apparatus according to this example is described with reference to FIG. 14. FIG. 14 is a flowchart illustrating an example of the processing flow of the image pickup apparatus according to this example.

In Step S1401, the HDR assistance mode detection unit 115 determines whether the HDR assistance mode is set. When the HDR assistance mode is set, the processing proceeds to Step S1402. When the HDR assistance mode is not set, the processing proceeds to Step S1412.

In Step S1402, the display processing unit 111 (the gradation conversion unit 200) converts the gradation values of the screen data with use of the LUT 1 (FIG. 4B). Then, the processing proceeds to Step S1403. In Step S1412, the display processing unit 111 (the gradation conversion unit 200) converts the gradation values of the screen data with use of the LUT 2 (FIG. 7B). Then, the processing proceeds to Step S1413.

In Step S1403, the screen determination unit 116 determines what the set screen mode is. When it is determined that the first screen mode (FIG. 10) is set, the processing proceeds to Step S1404. When it is determined that the second screen mode (FIG. 11) is set, the processing proceeds to Step S1405. When it is determined that the third screen mode (FIG. 12) is set, the processing proceeds to Step S1405.

In Step S1404, the control unit 101 provisionally determines the light emission brightness of the backlight unit 108 to be the light emission brightness β1 (≈α1). As a result, the upper-limit display brightness of the liquid-crystal display unit 105 is provisionally determined to be the upper-limit display brightness α1. In Step S1405, the control unit 101 provisionally determines the light emission brightness of the backlight unit 108 to be a light emission brightness β2 (≈α2). As a result, the upper-limit display brightness of the liquid-crystal display unit 105 becomes the upper-limit display brightness α2. In Step S1406, the control unit 101 provisionally determines the light emission brightness of the backlight unit 108 to be the light emission brightness β3 (≈α3). As a result, the upper-limit display brightness of the liquid-crystal display unit 105 is provisionally determined to be the upper-limit display brightness α3. After the processing in Step S1404, Step S1405, or Step S1406 is performed, the processing proceeds to Step S1407.

In Step S1407, the eye approach detection unit 1302 determines whether an object is close to the EVF 1301. When the eye approach detection unit 1302 determines that an object is close to the EVF 1301, the processing proceeds to Step S1410. When the eye approach detection unit 1302 determines that an object is not close to the EVF 1301, the processing proceeds to Step S1408.

In Step S1408, the lens detection unit 1304 determines whether the interchangeable lens 1303 is mounted on the image pickup apparatus. When the lens detection unit 1304 determines that the interchangeable lens 1303 is not mounted on the image pickup apparatus, the processing proceeds to Step S1410. When the lens detection unit 1304 determines that the interchangeable lens 1303 is mounted on the image pickup apparatus, the processing proceeds to Step S1409.

In Step S1409, the control unit 101 determines whether remote display in which the captured image is displayed on the external apparatus is performed on the basis of the communication state of the wireless communication unit 1305. When the control unit 101 determines that the remote display is performed, the processing proceeds to Step S1410. When it is determined that the remote display is not performed, the processing proceeds to Step S1411.

In Step S1410, the control unit 101 controls the light emission brightness of the backlight unit 108 to be the light emission brightness β3 (≈α3). Then, the processing proceeds to Step S1413. The upper-limit display brightness of the liquid-crystal display unit 105 is controlled to be the upper-limit display brightness α3=250 nits by the processing in Step S1410. As a result, the input-output characteristic 903 (long dashed dotted line) in FIG. 9 is realized. As a result, display suitable for both the user and the image pickup apparatus is realized. Specifically, the screen is displayed with a low brightness, and the increase in the power consumption or the temperature of the image pickup apparatus can be further suppressed. When an object is close to the EVF 1301, specifically, when an eye is approaching the EVF 1301, the user does not check the captured image displayed on the liquid-crystal display unit 105. When the interchangeable lens 1303 is not mounted on the image pickup apparatus, the user cannot check the through image. When the remote display is performed, the possibility of the user checking the captured image displayed on the liquid-crystal display unit 105 is extremely low. The processing in Step S1410 is performed those cases. Therefore, problems (difficulty in using the image pickup apparatus and the like) for the user are unlikely to occur even when the screen is displayed with a low brightness.

In Step S1411, the control unit 101 controls the light emission brightness of the backlight unit 108 to be the light emission brightness provisionally determined in Step S1404, Step S1405, or Step S1406. As a result, the upper-limit display brightness of the liquid-crystal display unit 105 is controlled to be the upper-limit display brightness provisionally determined in Step S1404, Step S1405, or Step S1406. As a result, display suitable for both the user and the image pickup apparatus is realized as in Example 1. Then, the processing proceeds to Step S1413.

In Step S1413, the control unit 101 determines whether the shutdown operation using the power source operation unit 112 is performed. When the shutdown operation is not performed, the processing is returned to Step S1401. Then, the processing in Step S1401 to Step S1413 is repeated until the shutdown operation is performed. When the shutdown operation is performed, the processing flow is ended.

As described above, according to this example, the upper-limit display brightness of the liquid-crystal display unit 105 is controlled on the basis of the determination result of the screen to be displayed on the liquid-crystal display unit 105 and other determination results. Specifically, when it is determined that an object is close to the EVF 1301, the upper-limit display brightness of the liquid-crystal display unit 105 is controlled to be the upper-limit display brightness α3 regardless of the other determination results. The upper-limit display brightness of the liquid-crystal display unit 105 is controlled to be the upper-limit display brightness α3 regardless of the other determination results also when it is determined that the interchangeable lens 1303 is not mounted on the image pickup apparatus. The upper-limit display brightness of the liquid-crystal display unit 105 is controlled to be the upper-limit display brightness α3 regardless of the other determination results also when it is determined that the captured image is displayed on the external apparatus. As a result, display suitable for the user and the display apparatus can be realized more reliably than Example 1.

One or two the processing of the processing in Step S1407, the processing in Step S1408, and the processing in Step S1409 may be omitted. For example, the processing in Step S1407 may be omitted. Then, even when an object is close to the EVF 1301, the processing in Step S1411 may be performed when it is determined that the interchangeable lens 1303 is mounted on the image pickup apparatus and when it is determined that the captured image is not displayed on the external apparatus. The processing in Step S1408 and Step S1409 may be omitted. Then, even when the interchangeable lens 1303 is not mounted on the image pickup apparatus and the captured image is displayed on the external apparatus, the processing in Step S1411 may be performed when it is determined that an object is not close to the EVF 1301.

The control unit 101 may perform the brightness control so that the upper-limit display brightness for when it is determined that an object is close to the EVF 1301 is lower than the upper-limit display brightness for when it is determined that the object is not close to the EVF 1301. For example, the control unit 101 may control the upper-limit display brightness of the liquid-crystal display unit 105 to be an upper-limit display brightness between the upper-limit display brightness α1 and the upper-limit display brightness α3 when the first screen is displayed and when it is determined that an object is close to the EVF 1301. The control unit 101 may control the upper-limit display brightness of the liquid-crystal display unit 105 to be an upper-limit display brightness between the upper-limit display brightness α2 and the upper-limit display brightness α3 when the second screen is displayed and when it is determined that an object is close to the EVF 1301. The control unit 101 may control the upper-limit display brightness of the liquid-crystal display unit 105 to be an upper-limit display brightness lower than the upper-limit display brightness α3 when the third screen is displayed and when it is determined that an object is close to the EVF 1301.

In the same manner, the control unit 101 may perform the brightness control so that the upper-limit display brightness for when it is determined that the image pickup apparatus is mounted on the interchangeable lens 1303 to be lower than the upper-limit display brightness for when it is determined that the interchangeable lens 1303 is not mounted on the image pickup apparatus. The control unit 101 may perform the brightness control so that the upper-limit display brightness for when it is determined that the captured image is displayed on the external apparatus is lower than the upper-limit display brightness for when it is determined that the captured image is not displayed on the external apparatus.

The functional units in Examples 1 and 2 may be individual hardware, but do not necessarily need to be individual hardware. The functions of at least two functional units may be realized by common hardware. A plurality of functions of one functional unit may be realized by individual hardware. At least two functions of one functional unit may be realized by common hardware. The functional units may be realized by hardware, but do not necessarily need to be realized by hardware. For example, an apparatus may include a processor and a memory having a control program stored therein. The functions of at least a part of the functional units included in the apparatus may be realized by reading the control program from the memory and executing the control program by the processor.

Examples 1 and 2 are only examples, and configurations obtained by modifying or altering the configurations in Examples 1 and 2 as appropriate within the scope of the gist of the present invention are also included in the present invention. Configurations obtained by combining the configurations in Examples 1 and 2 as appropriate are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-177655, filed on Sep. 15, 2017, which is hereby incorporated by reference herein in its entirety.

What is claimed is:

1. A display apparatus comprising:
    a display unit configured to display an image;
    an operation unit configured to receive an operation for instructing a mode to be set, out of a plurality of modes including a first mode in which a first image including an input image and not including a first graphic image is displayed and a second mode in which a second image including the input image and the first graphic image is displayed;
    a control unit configured to perform brightness control for controlling light emission brightness of a light source of the display apparatus so that an upper-limit display brightness in the second mode is lower than an upper-limit display brightness in the first mode; and
    an electronic viewfinder,
    wherein the control unit performs the brightness control so that an upper-limit display brightness in a case where an object is close to the electronic viewfinder is lower than an upper-limit display brightness in a case where the object is not close to the electronic viewfinder.

2. The display apparatus according to claim 1, further comprising a determination unit configured to determine a mode which is set, out of the plurality of modes,
    wherein the control unit controls the light emission brightness of the light source so that an upper-limit display brightness in a case where the determination unit determines that the second mode is set is lower than an upper-limit display brightness in a case where the determination unit determines that the first mode is set.

3. The display apparatus according to claim 1, wherein the control unit performs the brightness control so that an upper-limit display brightness in a in which a third image not including the input image and including a second graphic image is displayed is lower than the upper-limit display brightness in the first mode.

4. The display apparatus according to claim 3, wherein the control unit performs the brightness control so that the upper-limit display brightness in the third mode is lower than the upper-limit display brightness in the second mode.

5. The display apparatus according to claim 4, further comprising a determination unit configured to determine whether a lens is mounted on an image pickup apparatus that performs image pickup for acquiring the input image,
wherein the control unit performs the brightness control so that an upper-limit display brightness in a case where the determination unit determines that the lens is mounted on the image pickup apparatus is lower than an upper-limit display brightness in a case where the determination unit determines that the lens is not mounted on the image pickup apparatus.

6. The display apparatus according to claim 1, further comprising a determination unit configured to determine whether the input image is displayed on an external apparatus,
wherein the control unit performs the brightness control so that an upper-limit display brightness in a case where the determination unit determines that the input image is displayed on the external apparatus is lower than an upper-limit display brightness in a case where the determination unit determines that the input image is not displayed on the external apparatus.

7. The display apparatus according to claim 1, wherein a dynamic range of the input image is wider than a dynamic range of the first graphic image.

8. The display apparatus according to claim 3, wherein a dynamic range of the input image is wider than a dynamic range of the second graphic image.

9. The display apparatus according to claim 1, wherein the first graphic image is a menu image.

10. The display apparatus according to claim 9, wherein the first graphic image includes a menu image for changing shutter speed or white balance.

11. The display apparatus according to claim 3, wherein the second graphic image is a menu image.

12. The display apparatus according to claim 1, wherein, in a case where a predetermined display mode is set, the control unit performs gradation conversion processing so that a characteristic in which display brightness of the display panel unit linearly increases as data brightness of the input image displayed on the display panel unit increases is realized as an input-output characteristic that is a correspondence relationship between the data brightness and the display brightness.

13. The display apparatus according to claim 12, wherein the control unit performs the brightness control in a case where the predetermined display mode is set.

14. The display apparatus according to claim 12, wherein the predetermined display mode is an HDR assistance display mode.

15. The display apparatus according to claim 1, wherein the control unit is further configured to perform the brightness control so that the upper-limit display brightness of the second image in the second mode is lower than the upper-limit display brightness of the first image in the first mode in a case where the input image included in the first image and the input image included in the second image are a same image.

16. The display apparatus according to claim 1, wherein in the second mode, an upper-limit display brightness of the input image and an upper-limit display brightness of the first graphic image are the same and lower than the upper-limit display brightness of the first image in the first mode.

17. A method for controlling a display apparatus including a display unit configured to display an image, the method comprising:
receiving an operation for instructing a mode to be set, out of a plurality of modes including a first mode in which a first image including an input image and not including a graphic image is displayed and a second mode in which a second image including the input image and the graphic image is displayed; and
performing brightness control for controlling the light emission brightness of a light source of the display apparatus so that an upper-limit display brightness in the second mode is lower than an upper-limit display brightness in the first mode,
wherein the brightness control is performed so that an upper-limit display brightness in a case where a lens is mounted on an image pickup apparatus that performs image pickup for acquiring the input image is lower than an upper-limit display brightness in a case where the lens is not mounted on the image pickup apparatus.

18. A method for controlling a display apparatus including an electronic viewfinder and a display unit configured to display an image, the method comprising:
receiving an operation for instructing a mode to be set, out of a plurality of modes including a first mode in which a first image including an input image and not including a graphic image is displayed and a second mode in which a second image including the input image and the graphic image is displayed; and
performing brightness control for controlling light emission brightness of a light source of the display apparatus so that an upper-limit display brightness in the second mode is lower than an upper-limit display brightness in the first mode,
wherein the brightness control is performed so that an upper-limit display brightness in a case where an object is close to the electronic viewfinder is lower than an upper-limit display brightness in a case where the object is not close to the electronic viewfinder.

19. A display apparatus comprising:
a display unit configured to display an image;
an operation unit configured to receive an operation for instructing a mode to be set, out of a plurality of modes including a first mode in which a first image including an input image and not including a graphic image is displayed and a second mode in which a second image including the input image and the graphic image is displayed; and
a control unit configured to perform brightness control for controlling light emission brightness of a light source of the display apparatus so that an upper-limit display brightness in the second mode is lower than an upper-limit display brightness in the first mode,
wherein the control unit performs the brightness control so that an upper-limit display brightness in a case where a lens is mounted on an image pickup apparatus that performs image pickup for acquiring the input image is lower than an upper-limit display brightness in a case where the lens is not mounted on the image pickup apparatus.

20. The display apparatus according to claim 19, wherein the control unit performs the brightness control so that an upper-limit display brightness in a case where the input image is displayed on an external apparatus is lower than an upper-limit display brightness in a case where the input image is not displayed on the external apparatus.

* * * * *